United States Patent
Ohtani et al.

(10) Patent No.: US 9,777,127 B2
(45) Date of Patent: Oct. 3, 2017

(54) CARBON FIBER BUNDLE FOR RESIN REINFORCEMENT PURPOSES AND METHOD FOR PRODUCING SAME, AND CARBON-FIBER-REINFORCED THERMOPLASTIC RESIN COMPOSITION AND MOLDED PRODUCT THEREOF

(71) Applicant: MITSUBISHI RAYON CO., LTD., Chiyoda-ku (JP)

(72) Inventors: Tadashi Ohtani, Toyohashi (JP); Akira Harada, Yokkaichi (JP); Shoya Yoda, Yokohama (JP); Atsushi Takahashi, Toyohashi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 158 days.

(21) Appl. No.: 14/426,104

(22) PCT Filed: Sep. 4, 2013

(86) PCT No.: PCT/JP2013/073762
§ 371 (c)(1),
(2) Date: Mar. 4, 2015

(87) PCT Pub. No.: WO2014/038574
PCT Pub. Date: Mar. 13, 2014

(65) Prior Publication Data
US 2015/0225517 A1    Aug. 13, 2015

(30) Foreign Application Priority Data

Sep. 6, 2012 (JP) ................................. 2012-196588
May 31, 2013 (JP) ................................. 2013-115330

(51) Int. Cl.
*C08J 5/04* (2006.01)
*C08J 5/24* (2006.01)
(Continued)

(52) U.S. Cl.
CPC ............... *C08J 5/042* (2013.01); *B29B 15/12* (2013.01); *B29B 15/122* (2013.01); *B29B 15/14* (2013.01);
(Continued)

(58) Field of Classification Search
None
See application file for complete search history.

(56) References Cited

U.S. PATENT DOCUMENTS

2009/0062426 A1* 3/2009 Shiraki ................. C08F 255/02
                                                                 523/205
2009/0226728 A1    9/2009 Onoe et al.
(Continued)

FOREIGN PATENT DOCUMENTS

JP    02-084566 A    3/1990
JP    06-107442 A    4/1994
(Continued)

OTHER PUBLICATIONS

International Search Report issued Nov. 19, 2013 in PCT/JP2013/073762 filed Sep. 4, 2013.

*Primary Examiner* — Richard A Huhn
(74) *Attorney, Agent, or Firm* — Oblon, McClelland, Maier & Neustadt, L.L.P.

(57) ABSTRACT

The purpose of the present invention is to provide a carbon fiber bundle for resin reinforcement purposes, which is produced using a sizing agent that can exert satisfactory interface adhesiveness to both of a carbon fiber bundle and a thermoplastic resin in the production of a carbon-fiber-reinforced thermoplastic resin, and which has satisfactory emulsion stability. One embodiment of the present invention is a carbon fiber bundle for resin reinforcement purposes, which comprises a carbon fiber bundle and a polymer adhered onto the carbon fiber bundle, wherein the polymer is produced by binding an acid-modified polyolefin having (Continued)

a polyolefin structure and an acidic group in the molecular structure thereof to a hydrophilic polymer having a weight average molecular weight (Mw) of 450 or more, and wherein the ratio of the mass of the polyolefin structure to the mass of the acidic group in the acid-modified polyolefin is 100:0.1 to 100:10, the ratio of the mass of the acid-modified polyolefin to the mass of the hydrophilic polymer is 100:1 to 100:100, and the content of the polymer in the carbon fiber bundle for resin reinforcement purposes is 0.1 to 8.0 mass % inclusive.

18 Claims, 1 Drawing Sheet

(51) Int. Cl.
| | |
|---|---|
| *C08J 5/06* | (2006.01) |
| *B29B 15/12* | (2006.01) |
| *B29B 15/14* | (2006.01) |
| *C08K 3/04* | (2006.01) |
| *C08L 33/02* | (2006.01) |
| *C08L 23/26* | (2006.01) |
| *B29K 23/00* | (2006.01) |
| *B29K 307/04* | (2006.01) |

(52) U.S. Cl.
CPC . *C08J 5/06* (2013.01); *C08J 5/24* (2013.01); *B29K 2023/12* (2013.01); *B29K 2307/04* (2013.01); *C08J 2323/12* (2013.01); *C08J 2323/26* (2013.01); *C08J 2323/36* (2013.01); *C08K 3/046* (2017.05); *C08L 23/26* (2013.01); *C08L 33/02* (2013.01)

(56) References Cited

U.S. PATENT DOCUMENTS

| | | |
|---|---|---|
| 2011/0257325 A1 | 10/2011 | Asami |
| 2012/0015186 A1 | 1/2012 | Honma et al. |
| 2012/0135243 A1 | 5/2012 | Onoe et al. |
| 2012/0208019 A1* | 8/2012 | Sugiura .................... C08F 8/32 428/367 |
| 2013/0122262 A1 | 5/2013 | Nagakura et al. |
| 2013/0123407 A1 | 5/2013 | Hashimoto et al. |

FOREIGN PATENT DOCUMENTS

| | | | |
|---|---|---|---|
| JP | 2006-233346 A | | 9/2006 |
| JP | 2010-149353 A | | 7/2010 |
| JP | 2010-189658 A | | 9/2010 |
| JP | 2011-214175 A | | 10/2011 |
| JP | 2011214175 A | * | 10/2011 |
| JP | 2012-007280 A | | 1/2012 |
| JP | 2012-041658 A | | 3/2012 |
| WO | WO 2010/074118 A1 | | 7/2010 |
| WO | WO 2011/030784 A1 | | 3/2011 |
| WO | WO 2012/008561 A1 | | 1/2012 |
| WO | WO 2012/017877 A1 | | 2/2012 |

* cited by examiner

[Fig. 1]
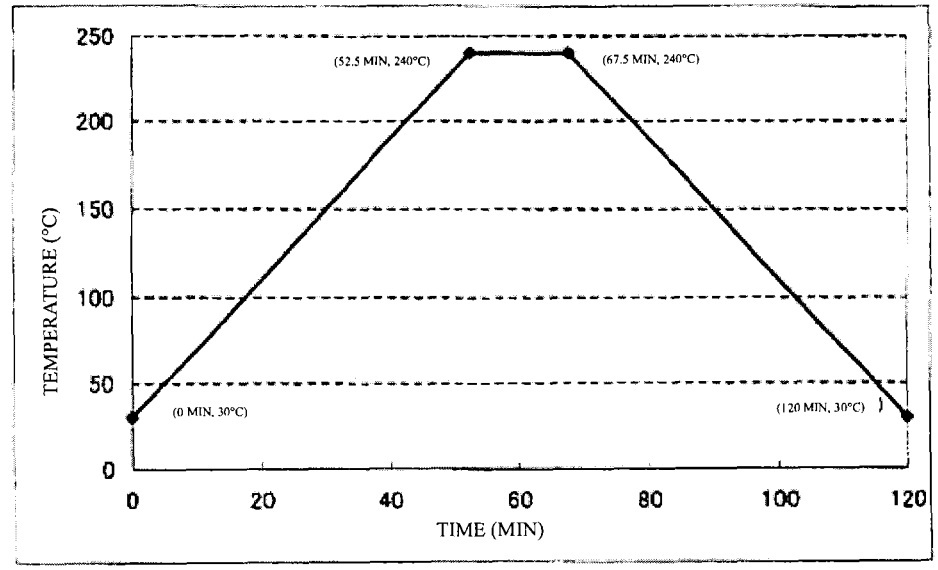
[Fig. 2]
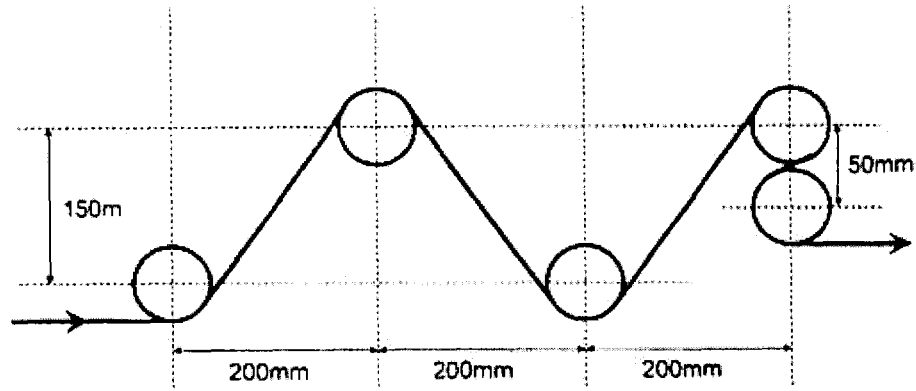

CARBON FIBER BUNDLE FOR RESIN REINFORCEMENT PURPOSES AND METHOD FOR PRODUCING SAME, AND CARBON-FIBER-REINFORCED THERMOPLASTIC RESIN COMPOSITION AND MOLDED PRODUCT THEREOF

TECHNICAL FIELD

The present invention relates to a carbon fiber bundle attached with a sizing agent (that is, a carbon fiber bundle for resin reinforcement purposes), which is used as a reinforcing material for thermoplastic resins, a method for producing the carbon fiber bundle, a carbon-fiber-reinforced thermoplastic resin composition using the carbon fiber bundle for resin reinforcement purposes, and a molded product of the thermoplastic resin composition.

BACKGROUND ART

A carbon fiber bundle is in the form in which plural carbon single fibers containing carbon as a main component (the component contained in the largest portion) are combined together. When a carbon-fiber-reinforced thermoplastic resin is produced using this carbon fiber bundle as a reinforcing material for a thermoplastic resin, the carbon fiber bundle is used, for example, in the form of chops cut to a length of 3 to 15 mm, or in the form of a continuous fiber.

In a case in which a pellet are produced by kneading chops of a carbon fiber bundle and a thermoplastic resin, it is preferable that the carbon fiber bundle is quantitatively supplied to an extruder; however, in order to do so, morphological stability of the carbon fiber bundle is important.

Furthermore, in a case in which a sheet material is produced by mixing or weaving carbon fiber bundles and impregnating the mixture or woven fabric with a thermoplastic resin, or a long fiber pellet is produced, the carbon fiber bundles are usually supplied to the production process in the form of continuous fiber; however, the carbon fiber bundles are prone to have fluffs generated therein and are prone to loosen, and handling thereof is difficult. Meanwhile, in the case of using carbon fiber bundles in the form of a woven fabric, weaving performance of the carbon fiber bundles, woven fabric handleability after weaving, and the like also constitute important characteristics.

Due to the reasons described above, carbon fiber bundles converged by a sizing treatment for the purpose of enhancing handleability of the carbon fiber bundles or the properties of a material having carbon fiber bundles incorporated therein, have been traditionally used. Regarding this sizing treatment, generally, use is made of a method of applying a sizing agent having compatibility with thermoplastic resins that are used as matrix resins, to the surface of a carbon fiber bundle in an amount of, for example, about 0.2% by mass to 5% by mass with respect to the carbon fiber bundles.

For this thermoplastic resin, a polycarbonate resin, a nylon resin, a polyester resin, and the like are frequently used; however, in recent years, investigations have been made on the use of polyolefin-based resins from the viewpoints of recyclability and economic efficiency. Among them, polypropylene resins in particular are resins that are attracting more attention.

However, polyolefin-based resins usually do not have polar groups in the molecular chain, and tend to have very low interfacial adhesiveness to carbon fibers or glass fibers. Thus, many of them do not sufficiently manifest an effect of enhancing the mechanical characteristics as reinforcing materials.

For this reason, Patent Document 1 discloses a method of improving the interfacial adhesiveness to a polyolefin-based resin as a matrix resin, by subjecting carbon fibers, glass fibers and the like to a sizing treatment with a sizing agent containing an acid-modified polypropylene as an essential component.

Furthermore, Patent Document 2 describes a carbon fiber bundle to which a self-emulsifying polypropylene-based resin dispersion liquid that can be emulsified without using a surfactant, has been applied.

Moreover, Patent Document 3 describes a carbon fiber bundle in which a composition containing an acid-modified polyolefin and a glycol ether-based compound is adhered to the surface as a sizing agent.

CITATION LIST

Patent Document

Patent Document 1: JP 6-107442 A
Patent Document 2: JP 2006-233346 A
Patent Document 3: JP 2012-7280 A

DISCLOSURE OF THE INVENTION

Problem to be Solved by the Invention

However, according to the investigations of the inventors of the present invention, the sizing agent containing an acid-modified polypropylene as an essential component as described in Patent Document 1 can realize relatively satisfactory interfacial adhesiveness with a polyolefin-based resin as a matrix resin. However, there are occasions in which the interfacial adhesiveness to carbon fibers is not sufficient. As the cause of this, the influence of the surfactant included in this sizing agent may be considered. Surfactants may have adverse influence on the adhesiveness between carbon fibers and the sizing agent, despite having no contribution on the adhesion between carbon fibers and a polyolefin-based resin.

On the other hand, in Patent Document 2, a self-emulsifying polyolefin-based resin that does not use a surfactant is used as the sizing agent; however, since a copolymer of ethylene and acrylic acid is used as this resin, the copolymer may not have sufficient affinity to polypropylene-based resins.

Furthermore, the carbon-fiber-reinforced resin described in Patent Document 3, which is produced using a sizing agent containing a glycol ether-based compound having a low molecular weight as a main component, has a possibility of having inferior water resistance. Furthermore, in a case in which an acid-modified polyolefin is adhered, in a state of being dispersed in water, to a carbon fiber bundle, when only a glycol ether-based compound having a low molecular weight is used in combination, the emulsion stability of the acid-modified polyolefin may be deteriorated.

The present invention was achieved in view of such circumstances. An object of the present invention is to provide a carbon fiber bundle for resin reinforcement purposes produced using a sizing agent which can exhibit satisfactory interfacial adhesiveness to both a carbon fiber bundle and a thermoplastic resin when a carbon-fiber-reinforced thermoplastic resin is produced, and which has satisfactory emulsion stability, and a method for producing the carbon fiber bundle. Another object of the present invention is to provide a carbon-fiber-reinforced thermoplastic resin using this carbon fiber bundle for resin reinforcement purposes, and a molded product thereof.

Means for Solving Problem

Embodiments of the present invention are as follows.

(1) A carbon fiber bundle for resin reinforcement purposes including a polymer (AB) adhered to a carbon fiber bundle, the polymer (AB) being a polymer formed by bonding an acid-modified polyolefin (A) having a polyolefin structure (a1) and an acidic group (a2) in the molecular structure to a hydrophilic polymer (B) having a weight average molecular weight (Mw) of 450 or more, in which the mass ratio between the polyolefin structure (a1) and the acidic group (a2) in the acid-modified polyolefin (A), (a1):(a2), is 100:0.1 to 100:10; the mass ratio between the acid-modified polyolefin (A) and the hydrophilic polymer (B), (A):(B), is 100:1 to 100:100; and the content of the polymer (AB) in the carbon fiber bundle for resin reinforcement purposes is from 0.1% by mass to 8.0% by mass.

(2) The carbon fiber bundle for resin reinforcement purposes described in item (1), wherein the acidic group (a2) is a carboxylic acid-derived group and/or a dicarboxylic acid anhydride-derived group.

(3) The carbon fiber bundle for resin reinforcement purposes described in item (1) or (2), wherein the acidic group (a2) in the polymer (AB) has been neutralized with a basic substance (C), or the acidic group (a2) has reacted with a basic substance (C), and an aqueous resin dispersion obtained by dispersing the polymer (AB) that has been neutralized with the basic substance (C) or the polymer (AB) that has reacted with the basic substance (C) in water at a solid content concentration of 30% by mass, has a pH at a temperature of 25° C. of from 6.0 to 10.0.

(4) The carbon fiber bundle for resin reinforcement purposes described in item (3), wherein the basic substance (C) is a basic substance having a molecular weight of 100 or less.

(5) The carbon fiber bundle for resin reinforcement purposes described in any one of the items (1) to (4), wherein the polymer (AB) is a graft copolymer in which the hydrophilic polymer (B) is graft-bonded to the acid-modified polyolefin (A).

(6) The carbon fiber bundle for resin reinforcement purposes described in any one of the items (1) to (5), wherein the hydrophilic polymer (B) is a polyetheramine having a weight average molecular weight (Mw) of from 500 to 3000.

(7) The carbon fiber bundle for resin reinforcement purposes described in any one of the items (1) to (6), wherein the polyolefin that forms the polyolefin structure (a1) is a stereoblock polypropylene polymer having an isotactic block and an atactic block, and/or a propylene-α-olefin copolymer having a content of the propylene unit of 50 mol % or more.

(8) The carbon fiber bundle for resin reinforcement purposes described in any one of the items (1) to (7), wherein the weight average molecular weight (Mw) of the acid-modified polyolefin (A) is from 10,000 to 500,000.

(9) The carbon fiber bundle for resin reinforcement purposes described in any one of the items (1) to (8), wherein the carbon fiber bundle is a carbon fiber bundle obtained by bundling plural single fibers, each single fiber having, on the surface, plural creases which have a difference in height of 40 nm or more between the highest part and the lowest part in a plane region defined by a length in the circumferential direction of the single fiber of 2 μm and a length in the fiber axial direction of 1 μm.

(10) The carbon fiber bundle for resin reinforcement purposes described in any one of the items (1) to (9), wherein the polymer (AB) and a resin composition (D) containing an epoxy resin as main components are adhered to the carbon fiber bundle, and the total content of the polymer (AB) and the resin composition (D) in the carbon fiber bundle for resin reinforcement purposes is from 0.1% by mass to 8.0% by mass.

(11) The carbon fiber bundle for resin reinforcement purposes described in item (10), wherein the epoxy resin included in the resin composition (D) is an aromatic epoxy resin.

(12) The carbon fiber bundle for resin reinforcement purposes described in item (10) or (11), wherein the viscosity at 25° C. of the resin composition (D) is 20,000 poises or less, and the mass ratio of the polymer (AB) and the resin composition (D) is 1:9 to 9.5:0.5.

(13) A carbon-fiber-reinforced thermoplastic resin composition including the carbon fiber bundle for resin reinforcement purposes described in any one of the (1) to (12) and a thermoplastic resin, in which the content of the carbon fiber bundle is from 3.0% by mass to 80.0% by mass.

(14) The carbon-fiber-reinforced thermoplastic resin composition described in item (13), wherein the thermoplastic resin is polypropylene.

(15) A carbon-fiber-reinforced thermoplastic resin composition including the carbon fiber bundle for resin reinforcement purposes described in any one of the items (10) to (12) and a thermoplastic resin, in which the content of the carbon fiber bundle is from 3.0% by mass to 80.0% by mass, and the thermoplastic resin is polypropylene and an acid-modified polypropylene.

(16) The carbon-fiber-reinforced thermoplastic resin composition described in item (15), wherein the content of the acid component in the thermoplastic resin composition is from 0.015% by mass to 0.20% by mass in terms of maleic anhydride.

(17) The carbon-fiber-reinforced thermoplastic resin composition described in item (15) or (16), wherein the mass ratio between the polymer (AB) and the resin composition (D) in the carbon fiber bundle for resin reinforcement purposes is 1:9 to 8:2.

(18) A molded product obtained by molding the carbon-fiber-reinforced thermoplastic resin composition described in any one of the items (13) to (17).

(19) A method for producing the carbon fiber bundle for resin reinforcement purposes described in any one of the items (1) to (12), the method including a step of applying an aqueous resin dispersion containing at least the polymer (AB) to the carbon fiber bundle, and drying the carbon fiber bundle.

(20) A method for producing the carbon fiber bundle for resin reinforcement purposes described in any one of the items (9) to (12), the method including a step of applying an aqueous resin dispersion containing at least the polymer (AB) to the carbon fiber bundle, and drying the carbon fiber bundle, in which the aqueous resin dispersion further includes the resin composition (D).

(21) The method for producing the carbon fiber bundle for resin reinforcement purposes described in item (19) or (20), wherein the polymer (AB) is dispersed at a 50% particle size of 200 nm or less in the aqueous resin dispersion containing the polymer (AB).

(22) A method for producing a carbon fiber bundle for resin reinforcement purposes, the method including applying an aqueous resin dispersion in which an olefin-based polymer compound is dispersed at a 50% particle size of 200 nm or less, to a carbon fiber bundle, and then drying the carbon fiber bundle.

Effect of the Invention

According to the present invention, when a carbon-fiber-reinforced thermoplastic resin composition (preferably, a thermoplastic resin composition using a polyolefin-based resin, particularly a polypropylene resin, as a thermoplastic resin) is produced using a particular sizing agent for carbon fiber bundles, interfacial adhesiveness that is satisfactory for any of the combination of the sizing agent and the carbon fiber bundle and the combination of the sizing agent and the thermoplastic resin, can be manifested. Therefore, a carbon-fiber-reinforced thermoplastic resin composition using the carbon fiber bundle for resin reinforcement purposes obtainable by the present invention has an advantage that the resin composition exhibits satisfactory mechanical strength, and a molded product obtained by molding the relevant resin composition also exhibits satisfactory mechanical strength.

BRIEF DESCRIPTION OF DRAWINGS

FIG. 1 is a graph showing the temperature increase conditions for autoclave molding in Example 9; and FIG. 2 is a schematic diagram illustrating the thread guide of the carbon fiber bundle for resin reinforcement purposes in Example 9.

MODE(S) FOR CARRYING OUT THE INVENTION

<Carbon Fiber Bundle for Resin Reinforcement Purposes>

The carbon fiber bundle for resin reinforcement purposes of the present invention is a carbon fiber bundle for resin reinforcement purposes including a polymer (AB) adhered to a carbon fiber bundle, the polymer (AB) being formed by bonding an acid-modified polyolefin (A) having a polyolefin structure (a1) and an acidic group (a2) in the molecular structure, to a hydrophilic polymer (B) having a weight average molecular weight (Mw) of 450 or more, in which the mass ratio between the polyolefin structure (a1) and the acidic group (a2) in the acid-modified polyolefin (A), (a1):(a2), is 100:0.1 to 100:10; the mass ratio between the acid-modified polyolefin (A) and the hydrophilic polymer (B), (A):(B), is 100:1 to 100:100; and the content of the polymer (AB) in the carbon fiber bundle for resin reinforcement purposes is from 0.1% by mass to 8.0% by mass. This polymer (AB) can function as a sizing agent.

(Acid-Modified Polyolefin (A))
Polyolefin Structure (a1)

Regarding the polyolefin (a1-1) that forms the polyolefin structure (a1), polyolefins that are known in the field of carbon fibers can be used, and there are no particular limitations. However, it is preferable to appropriately select the polyolefin in accordance with the matrix resin used in the carbon-fiber-reinforced thermoplastic resin composition. Meanwhile, for this polyolefin (a1-1), one kind may be used alone, or two or more kinds may be used in combination.

For example, in a case in which a polyolefin-based resin having at least a polyolefin structure (particularly polypropylene-based resin) is used as the matrix resin, for example, a propylene homopolymer (polypropylene) or a copolymer of propylene with another olefin other than propylene (propylene-olefin copolymer) can be used as the polyolefin (a1-1).

Meanwhile, regarding this olefin other than propylene, one kind may be used alone, or two or more kinds may be used in combination. Furthermore, as this olefin other than propylene, for example, an α-olefin (in the present invention, it is provided that ethylene is included in the α-olefin) can be used. Examples of the α-olefin include ethylene, 1-butene, 1-pentene, 1-hexene, 1-heptene, 1-octene, cyclopentene, cyclohexene, and norbornene. Among these, regarding the olefin other than propylene, it is preferable to use an α-olefin having from 2 to 6 carbon atoms from the viewpoint of the solubility of the resin in a solvent, and it is more preferable to use ethylene or 1-butene from the viewpoint of the melt viscosity of the resin.

Meanwhile, in the case of using a propylene homopolymer as the polyolefin (a1-1), it is preferable to use a stereoblock polypropylene polymer having an isotactic block and an atactic block, from the viewpoint of the solubility in a solvent. In addition, from the viewpoint of the handleability, based on the degree of crystallization, of the polypropylene homopolymer and an acid-modified polypropylene obtained by acid-modifying this polypropylene homopolymer, it is preferable that the isotactic block is contained at a proportion of from 20 mol % to 70 mol % in this propylene homopolymer. On the other hand, from the viewpoint of the mechanical characteristics of the carbon fiber bundle for resin reinforcement purposes formed by the polymer (AB) adhering to a carbon fiber bundle, it is preferable that the atactic block is contained at a proportion of from 30 mol % to 80 mol % in the propylene homopolymer. The content proportions of the various blocks in this polymer can be characterized by $^{13}$C-NMR.

Furthermore, in the case of using the copolymer described above (for example, a propylene-α-olefin copolymer) as the polyolefin (a1-1), the content of the propylene unit in this copolymer is preferably 50 mol % or more, and more preferably 70 mol % or more, from the viewpoint of the affinity with the matrix resin. On the other hand, the content of the propylene unit in the copolymer is less than 100 mol %. Meanwhile, the contents of the various units that constitute the polyolefin (a1-1) can be characterized by an NMR analysis.

From the above description, it is preferable in the present invention that the polyolefin (a1-1) is stereoblock polypropylene polymer having an isotactic block and an atactic block, and/or a propylene-α-olefin copolymer having a content of the propylene unit of 50 mol % or more. That is, it is preferable that the polyolefin (a1-1) is at least one selected from a stereoblock polypropylene polymer having at least an isotactic block and an atactic block, and a propylene-α-olefin copolymer having a content of the propylene unit of 50 mol % or more.

Acidic Group (a2)

The acidic group (a2) is not particularly limited, but preferred examples thereof include a carboxylic acid-derived group and a dicarboxylic acid anhydride-derived group. The carboxylic acid-derived group is a group formed by being derived from a carboxylic acid obtainable when a polyolefin having a polyolefin structure is acid-modified with a carboxylic acid. Furthermore, the dicarboxylic acid anhydride-derived group is a group formed by being derived from a dicarboxylic acid anhydride obtainable when a polyolefin having a polyolefin structure is acid-modified with a dicarboxylic acid anhydride.

Examples of the carboxylic acid that forms the carboxylic acid-derived group include acrylic acid, methacrylic acid, maleic acid, itaconic acid, fumaric acid, crotonic acid, and half-esters and half-amides of unsaturated dicarboxylic acids.

Furthermore, examples of the dicarboxylic acid anhydride that forms the dicarboxylic acid anhydride-derived group include maleic anhydride and itaconic anhydride. A specific example of the dicarboxylic acid anhydride-derived group is the following group (maleic anhydride-derived group).

[Chemical Formula 1]

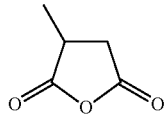

Incidentally, the acidic group (a2) carried by the acid-modified polyolefin (A) may be of one kind, or may be of two or more kinds.

The acid (a2-1) that forms the acidic group (a2) is preferably, among others, acrylic acid, methacrylic acid, maleic acid or maleic anhydride, and particularly preferably maleic anhydride, from the viewpoint of the reactivity with the polyolefin (a1-1).

The acidic group (a2) may be an acidic group other than the carboxylic acid-derived group and the dicarboxylic acid anhydride-derived group. Examples of the acidic group other than the carboxylic acid-derived group and the dicarboxylic acid anhydride-derived group include a hydroxyl group, a sulfo group, a sulfino group, a phosphono group, a thiol group, and a phosphoric acid group.

Composition of Acid-Modified Polyolefin (A)

The acid-modified polyolefin (A) used in the present invention contains the polyolefin structure (a1) and the acidic group (a2) at a mass ratio (a1):(a2) of 100:0.1 to 100:10. Incidentally, in the present specification, the symbol "~" includes the values, ratios and the like described before and after the symbol "~". When the mass ratio of the polyolefin structure (a1) and the acidic group (a2) is in this range, the content of the polyolefin structure in the acid-modified polyolefin is not significantly insufficient with respect to the acidic group, and therefore, there is no decrease in the adhesiveness between the carbon fibers and the thermoplastic resin that serves as a matrix resin. Furthermore, the mass ratio between the polyolefin structure (a1) and the acidic group (a2), (a1):(a2), in the acid-modified polyolefin (A) is preferably 100:0.5 to 100:7, from the same viewpoint as described above.

Furthermore, it is preferable to adjust the content proportion of the acidic group (a2) in the acid-modified polyolefin (A) to 0.1% by mass or more from the viewpoint of the dispersibility of the polymer (AB), and to 10% by mass or less from the viewpoint of the compatibility with the matrix resin. The content proportions of the various structures in this acid-modified polyolefin (A) can be characterized by an infrared absorption spectroscopic analysis (IR analysis).

The acid-modified polyolefin (A) may be composed of the polyolefin structure (a1) and the acidic group (a2); however, the acid-modified polyolefin (A) may also have, in addition to these structures, for example, a structure formed by a (meth)acrylic acid ester ((meth)acrylic acid ester unit) in the molecular structure.

The acid-modified polyolefin (A) may be in any form as long as the acid-modified polyolefin has the polyolefin structure (a1) and the acidic group (a2) in the molecular structure, and the form of incorporation is not particularly limited. This acid-modified polyolefin (A) may be, for example, a copolymer of the polyolefin (a1-1) and the acid (a2-1), specifically, a random copolymer, a block copolymer, or a graft copolymer (graft).

The method for producing the acid-modified polyolefin (A) is not particularly limited; however, examples thereof include a method of melt kneading the polyolefin (a1-1) that forms the polyolefin structure (a1) and the acid (a2-1) that forms the acidic group (a2); and a method of allowing the components to react in a solution of an organic solvent the like. Incidentally, it is also acceptable, if necessary, to use a polymerization initiator such as an organic peroxide or an azo compound in these methods. Furthermore, the acid-modified polyolefin (A) may also be produced by copolymerizing the acid (a2-1) that forms the acidic group (a2) at the time of producing the polyolefin (a1-1).

Weight Average Molecular Weight of Acid-Modified Polyolefin (A)

The weight average molecular weight (Mw) of the acid-modified polyolefin (A) measured by GPC (Gel Permeation Chromatography) and calculated relative to a calibration curve of polystyrene standards, is preferably 500,000 or less, and more preferably 200,000 or less, from the viewpoint of imparting excellent dispersibility to the polymer (AB).

Furthermore, the weight average molecular weight (Mw) of the acid-modified polyolefin (A) is preferably 10,000 or more. Thereby, excellent adhesiveness between the carbon fibers and the thermoplastic resin matrix (that is, the thermoplastic resin included in the carbon-fiber-reinforced thermoplastic resin composition that will be described below), and excellent bundling property of the carbon fiber bundle itself are obtained. Furthermore, when a sizing agent is adhered to carbon fibers using an aqueous resin dispersion, the sizing agent can be easily emulsified in the aqueous resin dispersion, and thus the particle size being increased in the aqueous resin dispersion can be easily suppressed.

(Hydrophilic Polymer (B))

In regard to the hydrophilic polymer (hydrophilic polymer compound) (B) used in the present invention, there are no particular limitations on the kind as long as the effects of the present invention are not significantly impaired, and for example, a synthetic polymer, a semi-synthetic polymer and a naturally-occurring polymer can all be used. Among these, it is preferable to use a synthetic polymer as the hydrophilic polymer, since the degree of hydrophilicity can be easily controlled, and the characteristics can be easily stabilized. Meanwhile, the hydrophilic polymer (B) means a polymer compound which gives an insoluble fraction of 1% by mass or less when the hydrophilic polymer is dissolved in water at 25° C. at a concentration of 10% by mass. In the present invention, a hydrophilic polymer (B) having a weight average molecular weight (Mw) of 450 or more is used. When the Mw of the hydrophilic polymer (B) is 450 or more, satisfactory emulsion stability is obtained when the polymer (AB) is formulated into an emulsion.

The hydrophilic polymer (B) used in the present invention is not limited as long as the hydrophilic polymer can react with the acid-modified polyolefin (A); however, this hydrophilic polymer (B) may have a reactive group (for example, a hydroxyl group, an epoxy group, primary to tertiary amino groups, an isocyanate group, and a (meth)acryloyl group).

Examples of the synthetic polymer include a an acrylic resin such as a poly(meth)acryl resin, a polyvinyl alcohol resin, a polyvinylpyrrolidone resin, a polyethyleneimine resin, and a polyether resin. The hydrophilic polymer may be used singly, or two or more kinds thereof may be used in combination. Among these, it is preferable to use a polyetheramine (PEA) as the hydrophilic polymer, from the viewpoint that the resulting polymer (AB) can be easily and stably dispersed in water. This polyetheramine is acceptable as long as it has a polyether structure and amino groups (primary to tertiary amino groups), and there are no particular limitations. Among these, a polyetheramine in which a resin having a polyether skeleton as, for example, the main skeleton (main chain) has primary amino groups (—$NH_2$) as reactive groups at one end or at both ends, is highly hydrophilic and is particularly preferred. Specific examples of the polyetheramine include methoxypoly(oxyethylene/oxypropylene)-2-propylamine and methoxypoly(oxyethylene/oxybutene)-2-propylamine.

Furthermore, from the viewpoints of the emulsion stability of the polymer (AB) and the water resistance of the carbon fiber bundle for resin reinforcement purposes, the weight average molecular weight (Mw) of the polyetheramine measured by GPC and calculated relative to a calibration curve of polystyrene standards is preferably from 500 to 3000.

Meanwhile, examples of the commercially available products of polyetheramine include JEFFAMINE (registered trademark) M series and JEFFAMINE (registered trademark) ED series manufactured by Huntsman International LLC, and these can be appropriately selected and used.

(Polymer (AB))

The polymer (AB) used in the present invention is a reaction product between the acid-modified polyolefin (A) and the hydrophilic polymer (B), and in the polymer (AB), the acid-modified polyolefin (A) and the hydrophilic polymer (B) are chemically bonded. Meanwhile, the mass ratio between the acid-modified polyolefin (A) and the hydrophilic polymer (B), (A):(B), is set to 100:1 to 100:100. With this mass ratio, a balance can be achieved between the adhesiveness of the carbon fibers to the thermoplastic resin matrix and the water-dispersibility of the polymer (AB). Particularly, when the mass ratio of the hydrophilic polymer (B) is adjusted to be equal to or less than the upper limit, the amount of the acid-modified polyolefin (A) in the polymer (AB) becomes relatively larger. Therefore, an effect of manifesting adhesiveness to the thermoplastic resin matrix can be obtained even with a smaller amount of the polymer (AB).

Furthermore, it is preferable to adjust this mass ratio to 100:2 to 100:30 from the viewpoint such as described above.

Meanwhile, the mass ratio of the acid-modified polyolefin (A) and the hydrophilic polymer (B) can be determined by identifying the hydrogen atoms and carbon atoms derived from the hydrophilic polymer by performing $^1$H-NMR and $^{13}$C-NMR analyses of the polymer (AB).

It is acceptable if the polymer (AB) has an acid-modified polyolefin (A)-derived structure and a hydrophilic polymer (B)-derived structure that are obtained at a particular mass ratio, and there are no particular limitations on the bonding form or bonding position between the acid-modified polyolefin (A) and the hydrophilic polymer (B) in the polymer (AB). This bonding form may be, for example, ionic bonding or covalent bonding, and it is preferable that the polymer (AB) is a graft copolymer in which the hydrophilic polymer (B) is graft-bonded to the acid-modified polyolefin (A). When the polymer (AB) is this graft copolymer, the polymer (AB) (bonded body) can be efficiently obtained by bonding the hydrophilic polymer (B) to the acid-modified polyolefin (A) during production.

Meanwhile, the synthesis method for obtaining the polymer (AB) from the acid-modified polyolefin (A) and the hydrophilic polymer (B) is not particularly limited, and various reaction methods can be used. For example, a reaction utilizing the acidic group (a2) of the acid-modified polyolefin (A) and the reactive group of the hydrophilic polymer (B) can be used. This reaction involves bonding by allowing the acidic group carried by the acid-modified polyolefin (A) to react with the reactive group carried by the hydrophilic polymer (B), and thereby, covalent bonds or ionic bonds are formed between the two groups. Examples of this reaction include an esterification reaction between a carboxyl group which is an acidic group and a hydroxyl group which is a reactive group; a ring-opening reaction between a carboxyl group which is an acidic group and an epoxy group which is a reactive group; an amidation reaction between a carboxyl group which is an acidic group and a primary or secondary amino group which is a reactive group; a quaternary ammonification between a carboxyl group which is an acidic group and a tertiary amino group which is a reactive group; and a urethanization reaction between a carboxyl group which is an acidic group and an isocyanate group which is a reactive group. The reaction ratio of the respective reactions may be arbitrarily selected from between 1% to 100%, and from the viewpoint of the dispersibility of the polymer (AB), the reaction ratio is preferably 10% to 100%, and more preferably 50% to 100%. Meanwhile, in the present invention, when the acid (a2-1) that forms the acidic group (a2) of the acid-modified polyolefin (A) is a dibasic acid or an anhydride thereof, only one acidic group in the dibasic acid may react with the hydrophilic polymer (B), or two acidic groups may react with the hydrophilic polymer (B).

(pH of Polymer (AB))

It is desirable that the pH at a temperature of 25° C. of an aqueous resin dispersion obtained by dispersing the polymer (AB) that is to be adhered to a carbon fiber bundle, in water at a solid content concentration of 30% by mass, is from 6.0 to 10.0. When this pH is 6.0 or more, a stable aqueous resin dispersion of the polymer (AB) can be easily obtained, and generation of aggregates can be easily suppressed. Furthermore, when the pH is 10.0 or less, the tendency of the viscosity increase in a dispersion liquid of the polymer (AB) can be easily prevented, and deterioration of workability can be easily prevented. Incidentally, in a case in which the acidic group (a2) is consumed by the reaction between the acid-modified polyolefin (A) and the hydrophilic polymer (B), and the acidic group (a2) is no longer available in the stage of the polymer (AB), the pH is usually in the range of 6.0 to 10.0. However, regardless of the presence or absence of the acidic group (a2) in the stage of the polymer (AB), when the pH is not in the range of 6.0 to 10.0, it is preferable to adjust the pH of the polymer (AB) that is to be adhered to the carbon fiber bundle, to this range using the following basic substance (C).

Adjustment of pH of Polymer (AB)

In the present invention, as described above, the pH of the polymer (AB) that is to be adhered to a carbon fiber bundle in the aqueous resin dispersion can be adjusted using a basic substance (C). That is, the carbon fiber bundle for resin reinforcement purposes of the present invention may be a carbon fiber bundle having the polymer (AB) and the basic substance (C) adhered thereto. At this time, the polymer (AB) and the basic substance (C) may be adhered to the carbon fiber bundle in a state of having formed a salt, and the polymer (AB) and the basic substance (C) may be adhered to the carbon fiber bundle in a state of having reacted with each other.

As described above, in a case in which there is no acidic group (a2) available in the stage of the polymer (AB), the pH is usually in the range of 6.0 to 10.0. Therefore, the case in which the acidic group (a2) is available in the stage of the polymer (AB) will be explained below.

In this case, the acidic group (a2) in the polymer (AB) is neutralized with the basic substance (C) or reacts with the basic substance (C), and the carbon fiber bundle for resin reinforcement purposes of the present invention becomes a carbon fiber bundle having the polymer (AB) which has been neutralized with this basic substance (C) or has reacted with the basic substance (C). The amount of addition of this basic substance (C) can be adjusted to an amount with which at least a portion of the acidic groups (a2) remaining in the polymer (AB) can be neutralized, or an amount larger than that. At this time, the amount of adhesion (amount of addition) of the basic substance (C) is adjusted such that an aqueous resin dispersion obtained by dispersing the polymer (AB) that has been neutralized by the basic substance (C) or has reacted with the basic substance (C), which is to be adhered to a carbon fiber bundle, in water at a solid content concentration of 30% by mass, has a pH at a temperature of 25° C. of from 6.0 to 10.0.

Basic Substance (C)

The basic substance (basic compound) (C) is not particularly limited as long as the pH of the polymer (AB) can be adjusted; however, for example, an alkali metal salt such as sodium hydroxide or potassium hydroxide; an alkaline earth metal salt, ammonia, methylamine, ethylamine, propylamine, butylamine, hexylamine, octylamine, ethanolamine, propanolamine, diethanolamine, N,N-dimethylethanolamine, dimethylamine, diethylamine, triethylamine, 2-methyl-2-aminopropanol, or morpholine can be used. Among these basic substances, it is desirable to use a basic substance having a molecular weight of 100 or less, and thereby, deterioration of water resistance caused by the bleed-out of the basic substance (C) can be easily suppressed. The basic substance (C) may be used singly, or two or more kinds may be used in combination. Meanwhile, in the present specification, the molecular weight of the basic substance (C) is defined to be used as a concept including the formula weight, and for those substances that do not exist as molecules, such as sodium hydroxide and potassium hydroxide, the value of the formula weight is regarded as the molecular weight. Furthermore, although there are substances that may be considered as basic substances (C) among the hydrophilic polymers (B), those substances should be regarded as hydrophilic polymers (B) in the present specification.

(Resin Composition (D))

The carbon fiber bundle for resin reinforcement purposes of the present invention may be a carbon fiber bundle having another resin adhered thereto, in addition to the polymer (AB). Regarding this another resin, for example, the resin composition (D) that is described below can be used. This resin composition (D) can function as a sizing agent. The resin composition (D) and the polymer (AB) may be respectively adhered to the carbon fiber bundle, or the resin composition (D) and the polymer (AB) may be mixed in advance and the mixture may be adhered to the carbon fiber bundle.

Furthermore, the polymer (AB) and the resin composition (D) may be adhered sequentially to the carbon fiber bundle; or aqueous resin dispersions of the substances may be respectively prepared in advance, followed by mixing of these aqueous resin dispersions, and the mixed liquid may be adhered to the carbon fiber bundle.

The method of preparing the respective aqueous resin dispersions in advance, and adhering a mixed liquid obtained by mixing these aqueous resin dispersions to a carbon fiber bundle, is preferred from the viewpoint that the two components can uniformly adhere to the carbon fiber bundle, and the proportions of the amounts of addition can be easily controlled.

The resin composition (D) includes an epoxy resin as a main component.

The term epoxy resin is used as the title of a category of thermosetting resins, and the title of a category of chemical substances called compounds having plural 1,2-epoxy groups in the molecule; however, in the present invention, the term epoxy resin is used in the latter meaning.

Incidentally, this main component means a component that is included at the largest content proportion (mass %) among the components included in this resin composition. Furthermore, the resin composition (D) may include, if necessary, a resin other than an epoxy resin (a vinyl acetate resin, a urethane resin, an acrylic resin, or the like), a silane coupling agent, an antistatic agent, a lubricant, and a leveling agent. However, from the viewpoints of the reactivity with the carbon fiber surface and the reactivity with the polymer (AB), the content proportion of the epoxy resin in the solid content of the resin composition (D) is preferably 50% by mass or more, and more preferably 65% by mass or more. There is no upper limit on the content proportion; however, in the case of applying the resin in the state of an aqueous resin dispersion described below to a carbon fiber bundle, the upper limit of the content proportion of the epoxy resin is a proportion obtained by excluding the amount of the emulsifier needed for the production of a dispersion liquid from 100% by mass, and the upper limit is usually 95% by mass or less.

The method for adhering this resin composition (D) to a carbon fiber bundle is not particularly limited; however, for example, the resin composition (D) may be directly adhered to the carbon fiber bundle, or this resin composition may be applied to the carbon fiber bundle after making this resin composition into a solution or an aqueous resin dispersion. However, from the viewpoints of the ease of management, safety and the like on the occasion of applying the resin composition to a carbon fiber bundle, it is preferable to apply the resin composition (D) in the state of an aqueous resin dispersion to the carbon fiber bundle. Therefore, the epoxy resin included in the resin composition (D) is desirably water-soluble or water-dispersible.

Examples of a water-soluble epoxy resin include a resin having glycidyl groups at both ends of an ethylene glycol chain and a resin having ethylene oxide added to both ends of a bisphenol of A-type, F-type, S-type or the like and having glycidyl groups at both ends thereof. Furthermore, an epoxy resin having alicyclic epoxy groups instead of glycidyl groups can also be used.

Examples of a water-dispersible epoxy resin include aromatic epoxy resins such as a bisphenol A type epoxy resin (for example, manufactured by Mitsubishi Chemical Corp., jER (registered trademark) W2821R70 (trade name)), a bisphenol F type epoxy resin, a bisphenol S type epoxy resin, a phenol novolac type epoxy resin, a cresol novolac type epoxy resin, a biphenyl type epoxy resin, and a naphthalene skeleton type epoxy resin; aliphatic epoxy resins; dicyclopentadiene type epoxy resins (for example, manufactured by DIC Corp., HP7200 (trade name)), glycidylamine type epoxy resins, and DPP novolac type epoxy resins (for example, manufactured by Mitsubishi Chemical Corp., jER (registered trademark) 157S65 (trade name)). Furthermore, epoxy resins having alicyclic epoxy groups instead of glycidyl groups can also be used.

Furthermore, from the viewpoint of the heat resistance of a carbon fiber bundle for resin reinforcement purposes including the polymer (AB) and the resin composition (D), the epoxy resin included in the resin composition (D) is preferably an aromatic epoxy resin.

Incidentally, an aqueous resin dispersion of the resin composition (D) is a dispersion liquid including at least the resin composition (D) and water, and may be composed of this resin composition (D) and water, or may include other components as long as the stability of the aqueous resin dispersion is not impaired. In a case in which the resin composition (D) containing a water-dispersible epoxy resin is adhered to a carbon fiber bundle, this resin composition (D) usually includes an emulsifier. There are no particular limitations on the emulsifier, and anionic, cationic and nonionic emulsifiers can be used. Among these, anionic or nonionic emulsifiers are preferred since these emulsifiers have satisfactory emulsifying performance and are inexpensive. In addition, the content of the emulsifier in the resin composition (D) is preferably 1% by weight to 70% by weight, to the extent that the effect of the epoxy resin in the resin composition (D) is not impaired.

(Content and Viscosity of Resin Composition)

The effect of using the resin composition (D) for the carbon fiber bundle for resin reinforcement purposes of the present invention includes an enhancement of the adhesiveness between the carbon fibers and the sizing agent layer at the carbon fiber surface.

From the viewpoint of achieving a balance between the adhesiveness of the polymer (AB) to the matrix resin that is described below, and the adhesiveness of the resin composition (D) to the carbon fiber surface, the mass ratio of the polymer (AB) and the resin composition (D) is preferably 1:9 to 9.5:0.5, and more preferably 2:8 to 9:1.

Also, the mass ratio between the polymer (AB) and the epoxy resin in the resin composition (D) is also preferably 1:9 to 9.5:0.5, and more preferably 2:8 to 9:1.

As will be described below, in regard to the carbon-fiber-reinforced thermoplastic resin composition of the present invention, when the thermoplastic resin includes polypropylene and an acid-modified polypropylene, the mass ratio of the polymer (AB) and the resin composition (D) is preferably 1:9 to 8:2, and more preferably 2:8 to 6:4. When the mass ratio is set to the range described above, the adhesiveness between both the polypropylene and the acid-modified polypropylene in the thermoplastic resin composition and the carbon fibers is improved.

Furthermore, an example of the effect of incorporating the resin composition (D) may be an enhancement of handleability of the carbon fiber bundle of the present invention. From the viewpoints of flexibility and fiber spreadability of the carbon fiber bundle for resin reinforcement purposes of the present invention, it is preferable that the viscosity of the resin composition (D) is 20,000 poises or less at 45° C.

(Carbon Fiber Bundle (Carbon Fiber Bundle Before Adhering Polymer (AB))

Regarding the carbon fiber bundle for the adhesion of the polymer (AB), any carbon fiber bundle known in the field of carbon fibers can be used, and there are no particular limitations. A conventional carbon fiber bundle is in a form in which from 1,000 to 60,000 single fibers having an average diameter of from 5 µm to 15 µm are bundled. The single fibers that constitute this carbon fiber bundle are obtained by, for example, fiberizing an acrylonitrile-based polymer (PAN-based polymer) or pitch, rayon, lignin or the like that are obtained from petroleum and coal, and carbonizing resultant. Particularly, a PAN-based carbon fiber obtained by using a PAN-based polymer as a raw material has excellent productivity and mechanical characteristics in the industrial scale. Meanwhile, it is acceptable if the PAN-based polymer has an acrylonitrile unit in the molecular structure, and may be a homopolymer of acrylonitrile or a copolymer of acrylonitrile and another monomer (for example, methacrylic acid). The content proportions of the acrylonitrile unit and the other monomer unit in the copolymer can be appropriately set according to the properties of the carbon fiber bundle produced.

Incidentally, the single fibers that constitute the carbon fiber bundle before the polymer (AB) or the resin composition (D) is adhered thereto, may have creases on the surface. A crease on the surface of a single fiber has a form of surface unevenness having a length of 1 µm or more in a certain direction. Furthermore, the direction of the crease is not particularly limited, and the crease may be parallel to or perpendicular to the fiber axial direction, or may have a certain angle with respect to the fiber axial direction.

Particularly, according to the present invention, it is preferable that the carbon fiber bundle is a carbon fiber bundle obtained by bundling plural single fibers, each single fiber having, on the surface, plural creases which have a difference in height of 40 nm or more between the highest part and the lowest part in a region of a circumferential length of 2 µm×a fiber axis direction length of 1 µm, in other words, a plane region defined by a length in the circumferential direction of the single fiber of 2 µm and a length in the fiber axial direction of 1 µm. Furthermore, the difference in height between the highest part and the lowest part is preferably 10% or less of the average diameter of the single fiber from the viewpoint of the stability of the production process for the carbon fiber bundle, and more specifically, the difference in height is preferably 1.5 µm or less. Examples of a carbon fiber bundle that satisfies these conditions include TR 50S, TR 30S, TRH50, TR 40 and MR 60H (all trade names) manufactured by Mitsubishi Rayon Co., Ltd.

Incidentally, when the creases are measured, the planar region described above can be selected randomly from the carbon fiber surface, and any part of the carbon fiber surface may be measured.

Regarding the carbon fiber bundle before being subjected to a sizing treatment with the polymer (AB), a carbon fiber bundle that has been carbonized, a carbon fiber bundle having an oxygen-containing functional group (for example, a carboxyl group) introduced to the surface by applying an electrolytic oxidation treatment, or a carbon fiber bundle in a state in which another sizing agent (pre-sizing agent) has been applied in advance, can also be used. For the pre-sizing agent, a sizing agent containing an epoxy resin as a main component (component that is included at the largest proportion) is preferred from the viewpoint of reactivity.

(Amount of Adhesion of Polymer (AB) and Resin Composition (D) to Carbon Fiber Bundle)

The content (amount of adhesion) of the polymer (AB) (when the basic substance (C) is used, the basic substance (C) is also included therein; hereinafter, the same) in the carbon fiber bundle for resin reinforcement purposes of the present invention can be set in accordance with the molding method, use and the like of the intended composite material; however, the content is adjusted to from 0.1% by mass to 8.0% by mass. When the content of the polymer (AB) is from 0.1% by mass to 8.0% by mass, since appropriate bundling property of the carbon fiber bundle is obtained, there is no deterioration of process passability at the time of molding processing. Furthermore, it is preferable to adjust this content of the polymer (AB) to from 0.3% by mass to 4.0% by mass from the same point of view.

In the case of using the resin composition (D) in combination with the polymer (AB), the total content of the polymer (AB) and the resin composition (D) is preferably from 0.1% by mass to 8.0% by mass, and more preferably 0.2% to 5.0% by mass. Furthermore, in regard to the amount of the epoxy resin included in the resin composition (D), the total content of the polymer (AB) and the epoxy resin is preferably from 0.1% by mass to 8.0% by mass, and more preferably 0.2% to 5.0% by mass.

When the total content of the polymer (AB) and the resin composition (D) is adjusted to the range described above, it is preferable because deterioration in the process passability at the time of molding processing caused by excessive bundling property or insufficient bundling property, does not easily occur.

The contents of the polymer (AB), resin composition (D) and epoxy resin in the carbon fiber bundle for resin reinforcement purposes of the present invention can be measured by comparing the mass of the carbon fiber bundle including the polymers, with the mass of the carbon fiber bundle after the polymers have been removed. Examples of the method for removing the polymers include a method of thermally decomposing the polymers at a high temperature, and a method of removing the polymers by dissolving the polymers in a solvent.

(Application (Method for Adhering Sizing Agent))

The carbon fiber bundle for resin reinforcement purposes of the present invention can be obtained by adhering at least the polymer (AB) as a sizing agent to a carbon fiber bundle before having a sizing agent adhered thereto. Furthermore, the polymer (AB) and the resin composition (D) may also be adhered thereto. The method for adhering this sizing agent is not particularly limited; however, for example, a method of preparing the polymer (AB) into an aqueous resin dispersion or a solution (hereinafter, may be referred to as sizing liquid), and bringing a carbon fiber bundle into contact therewith, is preferred.

Specifically, a touch-roll method of immersing a part of a roll in this sizing liquid to perform surface transfer, and then applying the sizing liquid by bringing a carbon fiber bundle into contact with this roll; an immersion method of immersing a carbon fiber bundle directly in the sizing liquid; or the like can be used. Adjustment of the amount of application of the sizing agent to the carbon fiber bundle can be carried out by regulating the concentration of the polymer (AB) or the resin composition (D) in the sizing liquid, or by regulating the amount of squeezing. It is more preferable that the sizing liquid is an aqueous resin dispersion, from the viewpoints of the ease of process management, safety and the like. Incidentally, there are no particular limitations on the method for producing the sizing agent; however, for example, in the case of using the sizing agent as an aqueous resin dispersion, a method of adding the sizing agent to water, heating the mixture in this state to a temperature higher than or equal to the melting point of this sizing agent, stirring the mixture under high shear conditions, and further cooling the mixture, may be used.

Subsequently to the sizing treatment, it is preferable to carry out a drying treatment. For the drying treatment, a hot air dryer, a panel heater dryer, a muffle furnace, a roll type dryer or the like can be used. Examples of the method for heated drying include a method of performing drying by passing carbon fiber bundles applied with a sizing liquid continuously through the dryer mentioned above; and a method of winding carbon fiber bundles applied with a sizing liquid around a tube-shaped member, and subjecting these to a batch treatment in a hot air dryer or a panel dryer. During the drying treatment, it is preferable to perform a continuous treatment capable of uniform heat treatment.

<Method for Producing Carbon Fiber Bundle Adhered with Polymer (AB)>

The carbon fiber bundle for resin reinforcement purposes of the present invention can be produced, as described above, according to a production method including a step of applying an aqueous resin dispersion containing at least the polymer (AB) to a carbon fiber bundle, and drying the carbon fiber bundle (adhesion step). In this adhesion step, the content of the polymer (AB) (when the basic substance (C) is used, the basic substance (C) is also included therein) in the carbon fiber bundle for resin reinforcement purposes obtainable by this drying, is adjusted to from 0.1% by mass to 8.0% by mass.

When an olefin-based polymer compound is used as a sizing agent, it is preferable because a carbon fiber bundle for resin reinforcement purposes having the sizing agent uniformly adhered thereto may be obtained by bringing the carbon fiber bundle into contact with an aqueous resin dispersion liquid in which the olefin-based polymer compound is finely dispersed, and drying the carbon fiber bundle. Specifically, the polymer compound is dispersed in the aqueous resin dispersion liquid preferably at a 50% particle size of 0.5 μm or less, more preferably at a 50% particle size of 0.3 μm or less, and particularly preferably at a 50% particle size of 0.2 μm (200 nm) or less. Here, the 50% particle size means the particle size of cumulative 50%, on a volume basis from the finer side, of the particle size of the resin particles dispersed in a liquid (also called 50% particle size, 50% average particle size, or volume average particle size).

Particularly, since the polymer (AB) of the present invention has superior dispersibility in water, an aqueous resin dispersion containing the polymer (AB) has a fine dispersed particle size, and the dispersed state of the resin is stable for a long time. When such an aqueous resin dispersion is used, a carbon fiber bundle for resin reinforcement purposes having the resin uniformly adhered to the carbon fiber surface can be easily obtained.

Similarly, when the 90% particle size is determined, more preferably the 90% particle size can be adjusted to 1 μm or less, and particularly preferably to 0.5 μm or less. When the dispersed particle size is made smaller, dispersion stability can be enhanced, aggregation cannot easily occur, and the particles can be dispersed more stably. Furthermore, a smaller ratio between the 90% particle size and the 50% particle size means that the particle size distribution is narrowed. Therefore, consequently, dispersion stability is enhanced.

Incidentally, dispersion according to the present invention is a concept including a state in which dispersed particles are dispersed as very small simple molecules, that is, a state that may be substantially regarded as dissolution. Therefore, there are no particular limitations on the lower limit of the dispersed particle size.

The solid content concentration of the aqueous resin dispersion used in the present invention may be appropriately adjusted such that the amount of the polymer (AB) included in the carbon fiber bundle for resin reinforcement purposes thus obtainable would be a desired amount; however, the solid content concentration is usually 30% by weight or less.

Furthermore, this production method may include the following steps before this adhesion step.

A step of obtaining an acid-modified polyolefin (A) having a polyolefin structure (a1) and an acidic group (a2) at a mass ratio (a1):(a2) of 100:0.1 to 100:10.

A step of obtaining a polymer (AB) by allowing the acid-modified polyolefin (A) to react with a hydrophilic polymer (B) having a weight average molecular weight (Mw) of 450 or more at a mass ratio (A):(B) of 100:1 to 100:100.

Furthermore, this production method may include the following step as necessary.

A step of adjusting the pH of the polymer (AB) using a basic substance (C), and thereby adjusting the pH at a temperature of 25° C. of an aqueous resin dispersion obtained by dispersing the polymer (AB) after the pH adjustment in water at a solid content concentration of 30% by mass, to from 6.0 to 10.0 (pH adjustment step).

In the case of carrying out the adhesion step after the pH adjustment step, the aqueous resin dispersion used in the adhesion step becomes an aqueous resin dispersion in which the polymer (AB) after the pH adjustment is dispersed in water. Furthermore, the acid-modified polyolefin (A) may be produced in one stage using a polyolefin (a1-1) and an acid (a2-1), or may be produced in two stages using a precursor in the same manner as in the Examples described below.

<Method for Producing Carbon Fiber Bundle Adhered with Polymer (AB) and Resin Composition (D)>

Furthermore, in the case of adhering the resin composition (D) to the carbon fiber bundle in addition to the polymer (AB), the carbon fiber bundle for resin reinforcement purposes of the present invention can be produced by, for example, a production method which includes a step of applying an aqueous resin dispersion obtained by dispersing the polymer (AB) and the resin composition (D) in water to a carbon fiber bundle, and drying the carbon fiber bundle (adhesion step). Meanwhile, in this adhesion step, the sum of the contents of the polymer (AB) (when the basic substance (C) is used, the basic substance (C) is also included therein) and the resin composition (D) in the carbon fiber bundle for resin reinforcement purposes obtained from this drying, is adjusted to from 0.1% by mass to 8.0% by mass.

Furthermore, this production method may include the following steps, in addition to the various steps described in the section <Method for producing carbon fiber bundle adhered with polymer (AB)>.

A step of producing an aqueous resin dispersion of the resin composition (D).

A step of mixing an aqueous resin dispersion of the resin composition (D) and an aqueous resin dispersion of the polymer (AB).

<Carbon-Fiber-Reinforced Thermoplastic Resin Composition>

The carbon fiber bundle for resin reinforcement purposes of the present invention can be suitably used as a reinforcing fiber in a thermoplastic resin composition. Examples of this thermoplastic resin include an acrylonitrile-butadiene-styrene copolymer (ABS), polyamides (nylon 6, nylon 66, and the like), polyacetal, polycarbonate, polypropylene, high-density polyethylene, low-density polyethylene, polyethylene terephthalate, polybutylene terephthalate, polyetherimide, polystyrene, polyether sulfone, polyphenylene sulfide, polyether ketone, and polyether ether ketone. Among these, it is preferable to use polypropylene (a polypropylene resin) as the thermoplastic resin from the viewpoints of the mechanical characteristics, thermal characteristics, and mass of the resin.

In the case of using polypropylene as the thermoplastic resin, in regard to the carbon fiber bundle for resin reinforcement purposes of the present invention, the resin adhered to the carbon fibers is preferably only the polymer (AB), or both the polymer (AB) and the resin composition (D).

It is also preferable to use polypropylene and an acid-modified polypropylene in combination as the thermoplastic resin. In this case, for the carbon fiber bundle for resin reinforcement purposes of the present invention, the resin that is adhered to the carbon fibers is preferably both the polymer (AB) and the resin composition (D). For example, it is preferable that the content of the acid component in the thermoplastic resin composition is from 0.015% by mass to 0.20% by mass in terms of maleic anhydride, and in this case, the mass ratio of polymer (AB):resin composition (D) is preferably 1:9 to 8:2, and more preferably 2:8 to 6:4. When the content of the acid component is adjusted to the range described above, the adhesiveness between the carbon fibers and the resin adhering thereto is enhanced, and when the carbon-fiber-reinforced thermoplastic resin is molded, satisfactory mold release properties from a metal mold or a release paper are obtained. Also, the carbon fiber bundle for resin reinforcement purposes has satisfactory adhesiveness to both the polypropylene component and the acid-modified polypropylene component in the matrix resin.

The content of the carbon fiber bundle in the carbon-fiber-reinforced thermoplastic resin composition containing the carbon fiber bundle for resin reinforcement purposes of the present invention and a thermoplastic resin may vary with the form of the carbon fiber bundle, the molding method and use of the composite material, and the like; however, from the viewpoint of cost performance, the content of the carbon fiber bundle is preferably from 3.0% by mass to 80.0% by mass, and more preferably from 5.0% by mass to 70.0% by mass, relative to the total amount of the carbon-fiber-reinforced thermoplastic resin composition.

The carbon-fiber-reinforced thermoplastic resin composition containing the carbon fiber bundle for resin reinforcement purposes of the present invention is preferably used in known forms such as a short fiber compound, a long fiber pellet, a random mat, a bulk molded compound, and a unidirectionally reinforced prepreg.

<Molded Product>

The carbon-fiber-reinforced thermoplastic resin composition of the present invention can be supplied as a molded product (carbon-fiber-reinforced composite molded product) having an arbitrary shape by molding the resin composition by a known molding method. The molded product obtainable from the carbon-fiber-reinforced thermoplastic resin composition of the present invention has excellent mechanical characteristics as well as excellent productivity and economic efficiency.

EXAMPLES

Hereinafter, the carbon fiber bundle for resin reinforcement purposes of the present invention will be explained more specifically by way of Examples, but these Examples are not intended to limit the scope of the present invention.

Production Example 1: Production of Maleic Anhydride-Modified Propylene-Based Copolymer Precursor 200 kg of TAFMER (registered trademark) XM-7070 (trade name, manufactured by Mitsui Chemicals, Inc., melting point: 75° C., content of propylene unit: 74 mol %, weight average molecular weight [Mw]: 240,000 (relative to polypropylene standards), molecular weight distribution [Mw/Mn]: 2.2), which is a propylene-butene copolymer polymerized using a metallocene catalyst (corresponding to the polyolefin (a1-1)), and 5 kg of maleic anhydride (MAH) (corresponding to the acid (a2-1)) were dry blended in a Supermixer. Thereafter, the blend was kneaded using a twin-screw extruder (manufactured by Japan Steel Works, Ltd., trade name: TEX54αII) under the conditions of a cylinder temperature of the kneading unit of 200° C., a speed of screw rotation of 125 rpm, and a discharge amount of 80 kg/hour, while PERBUTYL (registered trademark) 1 (manufactured by NOF Corp., polymerization initiator) was fed to the extruder in the middle of the process using a liquid-adding pump such that the amount of PERBUTYL was 1 part by mass relative to 100 parts by mass of the propylene-butene copolymer. Thus, a maleic anhydride-modified propylene-butene copolymer precursor in a pellet form was obtained.

The graft ratio of the maleic anhydride-derived group in the maleic anhydride-modified propylene-butene copolymer precursor thus obtained was 0.8% by mass (0.08 mmol/g in terms of the maleic anhydride-derived group, and 0.16 mmol/g in terms of the carboxylic acid-derived groups). Also, the weight average molecular weight (relative to polystyrene standards) [Mw] of this precursor was 156,000, and the number average molecular weight [Mn] was 84,000.

Production Example 2: Production of Maleic Anhydride-Modified Propylene-Based Copolymer Precursor A maleic anhydride-modified propylene-butene copolymer precursor in a pellet form was obtained in the same manner as in Production Example 1, except that the propylene-butene copolymer polymerized using a metallocene catalyst was changed to TAFMER (registered trademark) XM-7080 (trade name, manufactured by Mitsui Chemicals, Inc., melting point: 75° C., content of propylene unit: 74 mol %, weight average molecular weight [Mw] 306,600 (relative to polypropylene standards), and molecular weight distribution [Mw/Mn]: 2.0).

The graft ratio of the maleic anhydride-derived group in the maleic anhydride-modified propylene-butene copolymer precursor thus obtained was 0.7% by mass (0.07 mmol/g in terms of the maleic anhydride-derived group, and 0.14 mmol/g in terms of the carboxylic acid-derived groups). Also, the weight average molecular weight (relative to polystyrene standards) [Mw] of this precursor was 167,000, and the number average molecular weight [Mn] was 58,000.

Production Example 3: Production of Aqueous Resin Dispersion

In a glass flask equipped with a reflux cooling tube, a thermometer and a stirrer, 100 g of the maleic anhydride-modified propylene-butene copolymer precursor obtained in Production Example 1 and 150 g of toluene were introduced, the container was purged with nitrogen gas, and the precursor was dissolved by increasing the temperature to 110° C. Thereafter, 1.5 g of maleic anhydride and 1.0 g of PERBUTYL (registered trademark) I were added to the solution, and a reaction was carried out by continuously stirring the mixture at the same temperature (110° C.) for 7 hours. After completion of the reaction, the reaction mixture was cooled to room temperature (25° C.), acetone was added thereto, and a precipitated resin was separated by filtration. Furthermore, washing with acetone and separation by filtration were carried out, and a resin thus obtained was dried. Thereby, a maleic anhydride-modified propylene-butene copolymer corresponding to the acid-modified polyolefin (A) was obtained.

Next, 100 g of this modified copolymer and 100 g of toluene were introduced, and this modified copolymer was dissolved by increasing the temperature to 70° C. Subsequently, to this solution, a solution produced by dissolving 15 g (15 mmol; corresponding to 15 parts by mass relative to 100 parts by mass of the maleic anhydride-modified propylene-butene copolymer obtained as described above) of trade name: JEFFAMINE (registered trademark) M-1000 (methoxypoly(oxyethylene/oxypropylene)-2-propylamine (weight average molecular weight [Mw]: 1000)) manufactured by Huntsman International LLC as the hydrophilic polymer (B), in 280 g of isopropanol (IPA) was added dropwise, and the mixture was allowed to react for one hour at 70° C. Thus, a polymer (reaction product) liquid corresponding to the polymer (AB) was obtained.

Incidentally, this methoxypoly(oxyethylene/oxypropylene)-2-propylamine is a hydrophilic polymer which gives an insoluble content of 1% by mass or less when dissolved in water at 25° C. at a concentration of 10% by mass.

Subsequently, 1.4 g (15.6 mmol; corresponding to 1.0 part by mass relative to 100 parts by mass of the maleic anhydride-modified propylene-butene copolymer) of aminomethylpropanol (AMP) as the basic substance (C) was added to the polymer liquid. Thereafter, the temperature was maintained at 70° C., 280 g of water was added dropwise thereto while the system was stirred, and toluene and IPA were removed under reduced pressure. Thus, a milky white aqueous resin dispersion having a resin (polymer) solid content concentration of 30% by mass was obtained. This aqueous resin dispersion was subjected to the measurement of the cumulative 50% particle size, on a volume basis from the finer particle size side, using trade name: MICROTRAC UPA (Model 9340 batch type dynamic light scattering method) manufactured by Nikkiso Co., Ltd. As a result, the 50% particle size was 0.10 μm, and the 90% particle size was 0.2 μm. The pH of this aqueous resin dispersion at a temperature of 25° C. was 8.0.

Meanwhile, in Table 1, the case in which an aqueous resin dispersion could be obtained from the polymer thus produced (water-dispersibility was satisfactory) is described as ○; and the case in which an aqueous resin dispersion could not be obtained (water-dispersibility was poor) is described as x.

Acetone was added to a solution of the maleic anhydride-modified propylene-butene copolymer before being allowed to react with the hydrophilic polymer (B), this copolymer precipitated therefrom was separated by filtration, and the copolymer thus obtained was further washed with acetone. Then, the copolymer thus obtained was dried under reduced pressure, and thereby a modified copolymer (acid-modified polyolefin) in the form of a white powder was obtained. An infrared absorption spectroscopic analysis of this copolymer was carried out, and as a result, the graft ratio of the maleic anhydride-derived group was 1.5% by mass (0.15 mmol/g). Meanwhile, this graft ratio is a value determinable by the following formula.

$$(\text{Graft ratio } G) = 100 \times (W - W_0)/W_0$$

wherein in the above formula, W represents the mass of the acid-modified polyolefin (A), and $W_0$ represents the mass of the polyolefin (a1-1).

That is, the mass ratio between the propylene-butene copolymer structure (corresponding to the polyolefin structure (a1)) and the maleic anhydride-derived group (corresponding to the acidic group (a2)), (a1):(a2), in this copolymer was 100:1.5

Furthermore, the weight average molecular weight (relative to polystyrene standards) [Mw] of this copolymer (acid-modified polyolefin) was 135,000.

Production Example 4: Production of Aqueous Resin Dispersion

An aqueous resin dispersion was obtained in the same manner as in Production Example 3, except that 100 g of the maleic anhydride-modified propylene-butene copolymer precursor used in Production Example 3 was changed to 100 g of the maleic anhydride-modified propylene-butene copolymer precursor obtained in Production Example 2. Incidentally, the weight average molecular weight (relative to polystyrene standards) [Mw] of the modified copolymer (acid-modified polyolefin) produced in Production Example 4 was 145,000. Furthermore, the dispersed particle size of this aqueous resin dispersion was measured, and as a result, the 50% particle size was 0.2 µm, while the 90% particle size was 0.3 µm. Furthermore, the pH at a temperature of 25° C. of this aqueous resin dispersion was 6.9.

Production Example 5: Production of Aqueous Resin Dispersion 100 g of the maleic anhydride-modified propylene-butene copolymer precursor used in Production Example 3 was changed to 50 g of the maleic anhydride-modified propylene-butene copolymer precursor obtained in Production Example 2 and 50 g of a propylene-butene copolymer (trade name: TAFMER (registered trademark) XM-7080). Furthermore, the amount of addition of the aminomethylpropanol used as the basic substance (C) in Production Example 3 was changed from 1.4 to 0.7 g. Except for these, an aqueous resin dispersion was obtained in the same manner as in Production Example 3. The weight average molecular weight (relative to polystyrene standards) [Mw] of the modified copolymer (acid-modified polyolefin) produced in Production Example 5 was 242,000. Furthermore, the dispersed particle size of this aqueous resin dispersion was measured, and as a result, the 50% particle size was 0.09 µm, while the 90% particle size was 0.13 µm. Furthermore, the pH at a temperature of 25° C. of this aqueous resin dispersion was 6.9.

Production Example 6: Production of Aqueous Resin Dispersion

In a glass flask equipped with a reflux cooling tube, a thermometer and a stirrer, 100 g of the maleic anhydride-modified propylene-butene copolymer precursor obtained in Production Example 1 and 50 g of toluene were introduced, the container was purged with nitrogen, and this precursor was dissolved by increasing the temperature to 110° C. Thereafter, 6.0 g of maleic anhydride and 2.0 g of PERBUTYL (registered trademark) I were added to the solution, and a reaction was carried out by continuously stirring the mixture at the same temperature for 7 hours. After completion of the reaction, acetone was added to the reaction liquid, a copolymer precipitated therefrom was separated by filtration, and the copolymer thus obtained was washed with acetone. The copolymer after washing was dried under reduced pressure, and thereby a maleic anhydride-modified propylene-butene copolymer in the form of a white powder was obtained. An infrared absorption spectroscopic analysis of this modified copolymer (acid-modified polyolefin) was carried out, and as a result, the graft ratio of the maleic anhydride-derived group was 3.0% by mass (0.30 mmol/g). Furthermore, the weight average molecular weight (relative to polystyrene standards) [Mw] of this modified copolymer was 140,000.

Subsequently, in a glass flask equipped with a reflux cooling tube, a thermometer and a stirrer, 100 g of the modified copolymer thus obtained and 100 g of toluene were introduced, and this copolymer was dissolved by increasing the temperature to 70° C. Subsequently, to this solution, a solution produced by dissolving 10 g (10 mmol; corresponding to 10.0 parts by mass relative to 100 parts by mass of the modified copolymer thus obtained in the form of a white powder) of trade name: JEFFAMINE (registered trademark) M-1000 methoxypoly(oxyethylene/oxypropylene)-2-propylamine (weight average molecular weight [Mw]: 1000) manufactured by Huntsman International LLC as the hydrophilic polymer (B) in 120 g of isopropanol (IPA), was added dropwise thereto, and the mixture was allowed to react for one hour at 70° C. Thus, a polymer (reaction product) liquid was obtained.

Thereafter, the temperature of this polymer liquid was maintained at 70° C., and while the polymer liquid was stirred, 20 g of IPA and 70 g of water were added dropwise thereto. Furthermore, 241 g of water and 4.2 g of 25 mass % aqueous ammonia (ammonia 61 mmol; corresponding to 1.0% by mass with respect to the modified copolymer thus obtained in the form of a white powder) were added dropwise thereto, and toluene and IPA were removed under reduced pressure. Thereby, a milky white aqueous resin dispersion having a resin solid content concentration of 30% by mass was obtained. The dispersed particle size of this aqueous resin dispersion was measured, and as a result, the 50% particle size was 0.09 µm, while the 90% particle size was 0.15 µm. Furthermore, the pH at a temperature of 25° C. of this aqueous resin dispersion was 8.5.

Production Example 7: Production of Aqueous Resin Dispersion

An aqueous resin dispersion was obtained in the same manner as in Production Example 6, except that 5.0 g out of 10 g of the methoxypoly(oxyethylene/oxypropylene)-2-propylamine (weight average molecular weight [Mw] 1000) used in Production Example 6 was changed to 5.0 g of 25 mass % aqueous ammonia. Meanwhile, the weight average molecular weight (relative to polystyrene standards) of the modified copolymer (acid-modified polyolefin) produced in Production Example 7 was 140,000. Furthermore, the dispersed particle size of this aqueous resin dispersion was measured, and as a result, the 50% particle size was 0.15 µm, while the 90% particle size was 0.26 µm. Furthermore, the pH at a temperature of 25° C. of this aqueous resin dispersion was 7.7.

Production Example 8: Production of Aqueous Resin Dispersion

In a glass flask equipped with a reflux cooling tube, a thermometer and a stirrer, 100 g of a propylene-ethylene copolymer (trade name: LICOCENE PP1302, manufactured by Clariant Corp.) and 50 g of toluene were introduced, the container was purged with nitrogen gas, and this copolymer was dissolved by increasing the temperature to 110° C. Thereafter, 6.0 g of maleic anhydride and 2.0 g of PERBUTYL (registered trademark) I were added to this solution, and a reaction was carried out by continuously stirring the mixture at the same temperature for 7 hours. After completion of the reaction, the mixture was cooled to room temperature (25° C.), acetone was added thereto, and a resin precipitated therefrom was separated by filtration. Furthermore, the resin was washed with acetone and separated by filtration, and the resin thus obtained was dried. Thus, a maleic anhydride-modified propylene-ethylene copolymer was obtained. 100 g of this copolymer and 100 g of toluene were introduced, and this copolymer was dissolved by increasing the temperature to 70° C. Subsequently, a solution produced by dissolving 10 g (10 mmol; corresponding to 10 parts by mass relative to 100 parts by mass of the maleic anhydride-modified propylene-ethylene copolymer thus obtained) of trade name: JEFFAMINE (registered trademark) M-1000 (methoxypoly(oxyethylene/oxypropylene)-2-propylamine (weight average molecular weight [Mw] 1000)) manufactured by Huntsman International LLC as the hydrophilic polymer (B), in 75 g of isopropanol (IPA) was added dropwise to the solution, and the mixture was allowed to react for one hour at 70° C.

Thereafter, the temperature of this reaction liquid was maintained at 70° C., and 136 g of water was added dropwise thereto while the reaction liquid was stirred. Furthermore, 8 g of aminomethylpropanol and 184 g of water were added thereto. Toluene and IPA were removed under reduced pressure, and thereby a milky white aqueous resin dispersion having a resin solid content concentration of 30% by weight was obtained. The dispersed particle size of this aqueous resin dispersion was measured, and as a result, the 50% particle size was 0.21 while the 90% particle size was 0.50 µm. Furthermore, the pH at a temperature of 25° C. of this aqueous resin dispersion was 9.0.

Incidentally, acetone was added to a solution of the maleic anhydride-modified propylene-ethylene copolymer before being allowed to react with the hydrophilic polymer (B), the modified copolymer precipitated therefrom was separated by filtration, and the modified copolymer thus obtained was further washed with acetone. The modified copolymer obtained after the washing was dried under reduced pressure, and thereby, a modified polymer in the form of a white powder was obtained. An infrared absorption spectroscopic analysis of this modified polymer was carried out, and as a result, the graft ratio of the maleic anhydride-derived group was 4.0% by mass (0.40 mmol/g). The weight average molecular weight (calculated relative to polystyrene standards) [Mw] of this modified copolymer was 13,000.

Production Example 9: Production of Aqueous Resin Dispersion

An aqueous resin dispersion was obtained in the same manner as in Production Example 8, except that 8 g of the aminomethylpropanol used in Production Example 8 was changed to 6.3 g of 25 mass % aqueous ammonia. The weight average molecular weight (calculated relative to polystyrene standards) [Mw] of the modified copolymer (acid-modified polyolefin) produced in Production Example 9 was 13,000. Furthermore, the dispersed particle size of this aqueous resin dispersion was measured, and as a result, the 50% particle size was 0.18 µm, while the 90% particle size was 0.26 Furthermore, the pH at a temperature of 25° C. of this aqueous resin dispersion was 7.9.

Production Example 10: Production of Aqueous Resin Dispersion

An aqueous resin dispersion was obtained in the same manner as in Production Example 6, except that 100 g of the maleic anhydride-modified propylene-butene copolymer precursor obtained in Production Example 1, which was used in Production Example 6, was changed to 100 g of a propylene-ethylene copolymer (trade name: LICOCENE PP1302, manufactured by Clariant Corp.). The weight average molecular weight (calculated relative to polystyrene standards) [Mw] of the modified copolymer (acid-modified polyolefin) produced in Production Example 10 was 13,000. Furthermore, the dispersed particle size of this aqueous resin dispersion was measured, and as a result, the 50% particle size was 0.09 µm, while the 90% particle size was 0.22 µm. Furthermore, the pH at a temperature of 25° C. of this aqueous resin dispersion was 8.4.

Production Example 11: Production of Aqueous Resin Dispersion

In a glass flask equipped with a reflux cooling tube, a thermometer and a stirrer, 100 g of a propylene-ethylene copolymer (trade name: LICOCENE PP1302, manufactured by Clariant Corp.) and 50 g of toluene were introduced, the container was purge with nitrogen gas, and this copolymer was dissolved by increasing the temperature to 110° C. Thereafter, 6.0 g of maleic anhydride and 2.0 g of PERBUTYL (registered trademark) I were added to this solution, and a reaction was carried out by continuously stirring the mixture at the same temperature for 7 hours. After completion of the reaction, the reaction mixture was cooled to room temperature (25° C.), acetone was added thereto, and a resin precipitated therefrom was separated by filtration. The resin was further washed with acetone and separated by filtration, and the resin thus obtained was dried. Thereby, a solution of the maleic anhydride-modified propylene-ethylene copolymer was obtained. To this copolymer solution, a solution produced by dissolving 13.1 g of a 25 mass % aqueous solution of sodium hydroxide (sodium hydroxide: 82 mmol; corresponding to 3.3 parts by mass relative to 100 parts by mass of the maleic anhydride-modified propylene-ethylene copolymer thus obtained) in 30 g of isopropanol (IPA) and 70 g of water, was added dropwise, and the mixture was allowed to react for one hour at 70° C.

Thereafter, the temperature of this reaction liquid was maintained at 70° C., and while the reaction liquid was stirred, 50 g of water and 80 g of isopropanol were added dropwise thereto, followed by further addition of 20 g of water. Toluene and IPA were removed under reduced pressure, and thereby, a milky white aqueous resin dispersion having a resin solid content concentration of 30% by mass was obtained. The dispersed particle size of this aqueous resin dispersion was measured, and as a result, the 50% particle size was 0.20 µm, while the 90% particle size was 0.38 µm. Furthermore, the pH at a temperature of 25° C. of this aqueous resin dispersion was 8.2.

Incidentally, acetone was added to a solution of the maleic anhydride-modified propylene-ethylene copolymer before being allowed to react with the aqueous solution of sodium hydroxide, the modified copolymer precipitated therefrom was separated by filtration, and the modified copolymer thus obtained was further washed with acetone. The modified copolymer obtained after the washing was dried under reduced pressure, and thereby, a modified polymer in the form of a white powder was obtained. An infrared absorption spectroscopic analysis of this modified polymer was carried out, and as a result, the graft ratio of the maleic anhydride-derived group was 4.0% by mass (0.40 mmol/g). The weight average molecular weight (calculated relative to polystyrene standards) [Mw] of this modified copolymer was 13,000.

Production Example 12: Production of Aqueous Resin Dispersion

The operation was carried out in the same manner as in Production Example 6, except that 10 g of the methoxypoly(oxyethylene/oxypropylene)-2-propylamine used in Production Example 6 was changed to 5.0 g of 25 mass % aqueous ammonia, and the subsequent addition of 4.2 g of a 25 mass % aqueous ammonia to the polymer (reaction product) liquid was omitted. However, this polymer could not be dispersed in water, and an aqueous resin dispersion was not obtained.

Production Example 13: Production of Aqueous Resin Dispersion

The operation was carried out in the same manner as in Production Example 6, except that 10 g of the methoxypoly(oxyethylene/oxypropylene)-2-propylamine used in Production Example 6 was changed to 3.3 g of sodium hydroxide, and the subsequent addition of 4.2 g of 25 mass % aqueous ammonia to the polymer (reaction product) liquid was omitted. However, this polymer could not be dispersed in water, and an aqueous resin dispersion was not obtained.

Production Example 14: Production of Aqueous Resin Dispersion

In a glass flask equipped with a reflux cooling tube, a thermometer and a stirrer, 100 g of the maleic anhydride-modified propylene-butene copolymer precursor obtained in Production Example 1 and 50 g of toluene were introduced, the container was purge with nitrogen gas, and this copolymer was dissolved by increasing the temperature to 110° C. Thereafter, 6.0 g of maleic anhydride and 2.0 g of PERBUTYL (registered trademark) I were added to this solution, and a reaction was carried out by continuously stirring the mixture at the same temperature (110° C.) for 7 hours. After completion of the reaction, dilution of the reaction liquid was carried out by adding 92 g of toluene. Subsequently, 750 g of warm water at 70° C. was added thereto, the mixture was stirred for 30 minutes, and then the mixture was left to stand for 30 minutes. An aqueous phase thus separated was extracted. Subsequently, to this solution, a solution produced by dissolving 5 g (5 mmol; corresponding to 5 parts by mass relative to 100 parts by mass of the maleic anhydride-modified propylene-butene copolymer obtained as described above) of trade name: JEFFAMINE (registered trademark) M-1000 (methoxypoly(oxyethylene/oxypropylene)-2-propylamine (weight average molecular weight [Mw] 1000)) manufactured by Huntsman International LLC as the hydrophilic polymer (B) in 50 g of isopropanol (IPA), was added dropwise, and the mixture was allowed to react for one hour at 70° C. Thus, a polymer (reaction product) liquid corresponding to the polymer (AB) was obtained.

Subsequently, to this polymer liquid, 6.4 g (6.4 mmol; corresponding to 1.0% by mass relative to the maleic anhydride-modified propylene-butene copolymer) of dimethylethanolamine (DMEA) as the basic substance (C) dissolved in 120 g of distilled water and 140 g of IPA, was added.

Thereafter, the temperature was maintained at 70° C., and while the mixture was stirred, 155 g of water was added dropwise thereto. Toluene and IPA were removed under reduced pressure, and thereby, a milky white aqueous resin dispersion having a resin (polymer) solid content concentration of 30% by mass was obtained. This aqueous resin dispersion was subjected to the measurement of the cumulative 50% particle size, on a volume basis from the finer particle size side, using trade name: MICROTRAC UPA (Model 9340 batch type dynamic light scattering method) manufactured by Nikkiso Co., Ltd. As a result, the 50% particle size was 0.10 µm, and the 90% particle size was 0.18 µm. The pH of this aqueous resin dispersion at a temperature of 25° C. was 8.2.

Incidentally, acetone was added to a solution of the maleic anhydride-modified propylene-ethylene copolymer before being allowed to react with the hydrophilic polymer (B), this copolymer precipitated therefrom was separated by filtration, and the copolymer thus obtained was further washed with acetone. The copolymer thus obtained was dried under reduced pressure, and thereby, a modified copolymer (acid-modified polyolefin) in the form of a white powder was obtained. An infrared absorption spectroscopic analysis of this copolymer was carried out, and as a result, the graft ratio of the maleic anhydride-derived group was 3.0% by mass (0.30 mmol/g).

Production Example 15: Production of Epoxy Resin Dispersion

A sizing liquid was prepared by performing phase inversion emulsification by the following procedure using a mixer (manufactured by Tokushu Kika Kogyo Co., Ltd., trade name: HIVIS DISPER MIX, homomixer specifications: Model 3D-5 type).

A mixture of 80 parts by mass of an epoxy resin, jER (registered trademark) 157570 (trade name, manufactured by Mitsubishi Chemical Corp.), and 20 parts by mass of a surfactant, NC-723-SF (trade name, manufactured by Nippon Nyukazai Co., Ltd.) was kneaded and mixed at 90° C. using a planetary mixer and a homomixer, and thus a resin composition (the content of the epoxy resin in the solid content was 80% by mass) was obtained. Subsequently, deionized water was added dropwise in small amounts to this resin composition, and after passing the phase inversion point, the amount of water dropped was increased. Finally, an epoxy resin dispersion having a resin composition concentration of 40% by mass was obtained.

Production Example 16: Production of Aqueous Resin Dispersion

In a glass flask equipped with a reflux cooling tube, a thermometer and a stirrer, 100 g of the maleic anhydride-modified propylene-butene copolymer precursor obtained in Production Example 1 and 50 g of toluene were introduced, the container was purged with nitrogen gas, and this precursor was dissolved by increasing the temperature to 110° C. Thereafter, 5.0 g of maleic anhydride and 2.0 g of PERBUTYL (registered trademark) I were added to this solution, and a reaction was carried out by continuously stirring the mixture at the same temperature (110° C.) for 7 hours. After completion of the reaction, dilution of the mixture was carried out by adding 92 g of toluene thereto. Subsequently, 750 g of warm water at 70° C. was added thereto, and the mixture was stirred for 30 minutes. Thereafter, the mixture was left to stand for 30 minutes, and an aqueous phase thus separated was extracted. The acid value of the maleic acid-modified propylene-butene copolymer precursor thus obtained was 26.

Subsequently, to this solution, a solution produced by dissolving 200 g (200 mmol; corresponding to 5 parts by mass relative to 100 parts by mass of the maleic anhydride-modified propylene-butene copolymer precursor obtained as described above) of trade name: JEFFAMINE (registered trademark) M-1000 (methoxypoly(oxyethylene/oxypropylene)-2-propylamine (weight average molecular weight [Mw] 1000)) manufactured by Huntsman International LLC as the hydrophilic polymer (B) in 50 g of isopropanol (IPA), was added dropwise, and the mixture was allowed to react for one hour at 70° C. Thus, a polymer (reaction product) solution was obtained.

Subsequently, 120 g of distilled water and 140 g of IPA were added to the polymer solution thus obtained, and the mixture was stirred for 30 minutes. Thereafter, the temperature was maintained at 70° C., and while the mixture was stirred, 155 g of water was added dropwise thereto. Toluene and IPA were removed under reduced pressure, and thereby, a yellow aqueous resin aqueous solution having a resin (polymer) solid concentration of 70% by mass was obtained.

Example 1

A carbon fiber bundle (manufactured by Mitsubishi Rayon Co., Ltd., trade name: PYROFIL (registered trademark) TR 50S15L (number of filaments: 15,000, strand strength: 5000 MPa, strand elastic modulus: 242 GPa), which was not adhered with a sizing agent, was immersed in an aqueous resin dispersion that was prepared from the aqueous resin dispersion obtained in Production Example 3 at a solid content concentration of 6.0% by mass, and the carbon fiber bundle was passed through between nip rolls. Thereafter, this carbon fiber bundle was dried by bringing the carbon fiber bundle into contact for 10 seconds with a heated roll having the surface temperature adjusted to 140° C. Thus, a carbon fiber bundle having a sizing agent adhered thereto (carbon fiber bundle for resin reinforcement purposes) was obtained.

<Depth of Creases on Single Fiber Surface of Carbon Fiber Bundle>

The depth of the creases existing on the single fiber surface of a carbon fiber bundle which was not adhered with a sizing agent, is defined by the difference in height between the highest part and the lowest part in a region of a circumferential length of 2 μm×a length in the fiber axis direction of 1 μm. The difference in height was measured based on a surface shape obtainable by scanning the surface of a single fiber using scanning atomic force microscopy (AFM). Specifically, the procedure was as follows.

Several single fibers of a carbon fiber bundle which was not adhered with a sizing agent were mounted on a sample stage, and the single fibers were fixed at two ends. Dotite was applied around the single fibers, and the resultant was used as a measurement sample. A range of 2 to 7 μm (this length is defined by the length projected on a plane parallel to the fiber axis) in the circumferential direction of the a single fiber was repeatedly scanned by atomic force microscopy (manufactured by Seiko Instruments, Inc., SP13700/ SPA-300 (trade name)) using a cantilever formed of silicon nitride, in an AFM mode while the sample was moved through little by little over a length in the fiber axis direction of 1 μm. From the analyzed image thus obtained, low frequency components were cut off by two-dimensional Fourier transform, and then the image was subjected to inverse transformation. From a planar image of a cross-section thus obtained, from which the curvature of the single fiber was removed, the difference in height between the highest part and the lowest part in a region of a circumferential direction of 2 μm×a length in the fiber axis direction of 1 μm was read out and evaluated.

Incidentally, the carbon fiber bundle (trade name: TR 50S15L) that was not adhered with a sizing agent, which was used in Example 1, had plural creases each having a depth of 100 nm.

<Measurement of Content of Sizing Agent>

About 2 g of a carbon fiber bundle adhered with a sizing agent was collected, and the mass (W1) was measured. Thereafter, this carbon fiber bundle was left to stand for 15 minutes in a muffle furnace (manufactured by Yamato Scientific Co., Ltd., trade name: FP410) set at a temperature of 450° C. in a nitrogen gas stream at a rate of 50 liters (volume at 1 atmosphere and 25° C.)/min, and thus the sizing agent was completely thermally decomposed. Then, the carbon fiber was transferred to a vessel in a dry nitrogen gas stream at a rate of 20 liters (volume at 1 atmosphere and 25° C.)/min, and the carbon fiber bundle was cooled or 15 minutes. The carbon fiber bundle thus obtained was weighed (W2), and the content of the sizing agent in the carbon fiber bundle adhered with a sizing agent was determined by the following formula.

(Content of sizing agent (mass %))=$(W1-W2)/W1 \times 100$

<Production of Carbon-Fiber-Reinforced Thermoplastic Resin Composition and Measurement of Properties>

The obtained carbon fiber bundle adhered with a sizing agent was cut to a length of 6 mm (length in the fiber axis direction) using a roving cutter, and thus carbon fiber chopped strands were produced. One kilogram in total of a dry blend of 200 g of the carbon fiber chopped strands thus obtained and 800 g of a polypropylene resin (manufactured by Nippon Polypropylene Corp., trade name: NOVATEC (registered trademark) MA3) was supplied to the hopper of an extruder, and the mixture was melt kneaded and extruded into a strand form. The strands were cooled in water and then were cut. Thus, a carbon-fiber-reinforced thermoplastic resin composition pellet was obtained.

The pellet was dried, and then a strip type test piece having a size of 10.0 mm in width, 80 mm in length, and 4 mm in thickness was produced in an injection molding machine at 230° C. A three-point bending test was carried out by the test method of ISO 178, and thus the flexural strength was measured.

Examples 2 to 8

Carbon fiber bundles adhered with a sizing agent, and carbon-fiber-reinforced thermoplastic resin compositions were produced in the same manner as in Example 1, except that the aqueous resin dispersions obtained in Production Examples 4 to 10 were respectively used instead of the aqueous resin dispersion obtained in Production Example 3, and the carbon fiber bundles and the resin compositions were evaluated.

Comparative Example 1

A carbon fiber bundle adhered with a sizing agent and a carbon-fiber-reinforced thermoplastic resin composition were produced in the same manner as in Example 1, except that the aqueous resin dispersion obtained in Production Example 11 was used instead of the aqueous resin dispersion obtained in Production Example 3, and the carbon fiber bundle and the resin composition were evaluated.

Comparative Examples 2 and 3

Attempts were made to use the aqueous resin dispersions obtained in Production Examples 12 and 13 instead of the aqueous resin dispersion obtained in Production Example 3; however, as described above, aqueous resin dispersions could not be obtained in these Examples, and therefore, the subsequent operation was not carried out.

The results of Examples 1 to 8 and Comparative Examples 1 to 3 are presented in Table 1. The molded products of Examples have superior flexural strength compared with the molded products of Comparative Examples. From the results shown above, it was found that according to the present invention, a carbon fiber bundle adhered with a sizing agent that has satisfactory interfacial adhesiveness to both the carbon fiber bundle and the thermoplastic resin, a method for production thereof, a carbon-fiber-reinforced thermoplastic resin using the carbon fiber bundle, and a molded product of the carbon-fiber-reinforced thermoplastic resin are obtained.

an aqueous resin dispersion that was prepared from the aqueous resin dispersion obtained in Production Example 3 at a solid content concentration of 2.0% by mass, and the carbon fiber bundle was passed through between nip rolls. Thereafter, this carbon fiber bundle was dried by bringing the carbon fiber bundle into contact for 10 seconds with a heated roll having the surface temperature adjusted to 140° C. Thus, a carbon fiber bundle having a sizing agent adhered thereto (carbon fiber bundle for resin reinforcement purposes) was obtained.

<Production of Carbon-Fiber-Reinforced Thermoplastic Resin Composition and Measurement of Properties 2>

(Production of Carbon Fiber Sheet and Prepreg)

A unidirectional carbon fiber sheet of carbon fibers having a fiber areal weight (FAW: mass per unit area) of 145 g/m$^2$ was produced by winding a produced carbon fiber bundle for resin reinforcement purposes around a drum winder.

Appropriate tension was applied to the carbon fiber sheet thus produced, and the carbon fiber sheet was laminated, on either side of the carbon fiber sheet, with a film obtained by molding a polypropylene resin SA06GA (trade name, manufactured by Japan Polypropylene Co., Ltd.) to a thickness of 40 μm, a film made of a fluororesin (manufactured by Nitto Denko Corp., trade name: NITOFLON FILM 970-4UL), and a flat plate made of aluminum in this order. Then, a

TABLE 1

| | | | Acid-modified polyolefin (A) | | | | | | | | | Carbon fiber bundle Content of sizing agent Mass % | Mechanically reinforced resin Flat plate flexural strength Mpa |
|---|---|---|---|---|---|---|---|---|---|---|---|---|---|
| | | Production Method | Polyolefin structure (a1) Polypropylene compound | Acidic group (a2) Acid compound | Mass ratio (a1)/(a2) | Hydrophilic polymer (B) Kind | Reaction mass ratio (A)/(B) | Basic substance (C) Basic substance compound | Mass ratio (A)/(C) | Water dispersibility | pH | | |
| Example | 1 | Production Example | 3 | TAFMER SM7070 | MAH | 100/1.5 | PEA | 100/15 | AMP | 100/1.0 | ○ | 8.0 | 1.3 | 104 |
| | 2 | | 4 | TAFMER XM7080 | MAH | 100/1.5 | PEA | 100/15 | AMP | 100/1.0 | ○ | 6.9 | 1.5 | 100 |
| | 3 | | 5 | TAFMER XM7080 | MAH | 100/1.2 | PEA | 100/10 | AMP | 100/0.5 | ○ | 6.9 | 1.2 | 100 |
| | 4 | | 6 | TAFMER XM7070 | MAH | 100/3.0 | PEA | 100/5 | NH$_3$ | 100/1.0 | ○ | 8.5 | 1.3 | 120 |
| | 5 | | 7 | TAFMER XM7070 | MAH | 100/3.0 | PEA | 100/5 | NH$_3$ | 100/1.2 | ○ | 7.7 | 1.3 | 131 |
| | 6 | | 8 | LICOCENE PP1302 | MAH | 100/4.0 | PEA | 100/10 | AMP | 100/8.0 | ○ | 9.0 | 1.4 | 80 |
| | 7 | | 9 | LICOCENE PP1302 | MAH | 100/4.0 | PEA | 100/10 | NH$_3$ | 100/1.5 | ○ | 7.9 | 1.3 | 85 |
| | 8 | | 10 | LICOCENE PP1302 | MAH | 100/4.0 | PEA | 100/10 | NH$_3$ | 100/1.0 | ○ | 8.4 | 1.3 | 82 |
| | 9 | | 14 | TAFMER XM7070 | MAH | 100/3.0 | PEA | 100/5 | DMEA | 100/6.4 | ○ | 8.4 | — | — |
| Comparative Example | 1 | | 11 | LICOCENE PP1302 | MAH | 100/4.0 | — | — | NaOH | 100/3.3 | ○ | 8.2 | 1.4 | 67 |
| | 2 | | 12 | TAFMER XM7070 | MAH | 100/3.0 | — | — | NH$_3$ | 100/1.2 | × | — | — | — |
| | 3 | | 13 | TAFMER XM7070 | MAH | 100/3.0 | — | — | NaOH | 100/3.3 | × | — | — | — |
| | 4 | | 16 | TAFMER XM7070 | MAH | 100/2.3 | PEA | 100/200 | — | — | ○ | — | — | — |

Example 9

A carbon fiber bundle (manufactured by Mitsubishi Rayon Co., Ltd., trade name: PYROFIL (registered trademark) TR 50S15L (number of filaments: 15,000, strand strength: 5000 MPa, strand elastic modulus: 242 GPa), which was not adhered with a sizing agent, was immersed in semi-impregnated prepreg (continuous fiber-reinforced sheet) in which carbon fibers were unidirectionally (UD) oriented was produced under the conditions of 230° C. to 240° C. for 5 minutes at 20 kPa on a heating plate and for 5 minutes at 20 kPa on a cooling plate of an electric heating and cooling two-stage press. Here, the fiber areal weight (TAW) of this prepreg was 218 g/m$^2$.

(Molding of Unidirectional Carbon Fiber Composite Material Molded Plate (12 ply))

The unidirectional prepreg thus obtained was cut patternwise to a size of 150 mm in length (length in the 0° direction (direction parallel to the fiber axis direction of the carbon fiber)×150 mm in width (length in the 90° direction (direction perpendicular to the fiber axis direction of the carbon fiber). Subsequently, the patternwise cut unidirectional prepreg was aligned in the 0° direction, and 12 sheets were laminated (12 ply). After bagging, autoclave molding was performed at a nitrogen pressure of 0.7 MPa under the temperature increase conditions shown in FIG. 1. Thus, a unidirectional carbon fiber composite material molded plate having a thickness of about 2 mm was obtained.

(90° Bending Test)

A test specimen was produced by cutting the unidirectional carbon fiber composite material molded plate obtained as described above to a dimension of 60 mm in length (length in the 90° direction)×12.7 mm in width (length in the 10° direction) using a wet type diamond cutter. The specimen thus obtained was subjected to a three-point bending test by a method equivalent to ASTM D790 (indenter R=5.0, L/D=16) using a universal tester (manufactured by Instron Corp., trade name: INSTRON 5565) and an analytical software (trade name: BLUEHILL), and thus the 90° flexural strength was calculated.

(Evaluation of Fiber Spreadability)

The carbon fiber bundle for resin reinforcement purposes thus produced was subjected to hard chrome plating #200 satin finish processing with the thread guide shown in FIG. 2 and to scraping with a bar having a diameter of 45 mm, and then the carbon fiber bundle was wound around a drum winder having a circumference of 2 m. Thus, a unidirectional carbon fiber sheet of carbon fibers having a fiber areal weight: mass per unit area) of 145 g/m² was produced until the width of the carbon fiber sheet reached 300 mm. The tension of the carbon fiber bundle before being brought into contact with the bar of the satin finish processing was set to 6.5 N per 1 g of the fiber areal weight of the carbon fiber bundle.

At this time, in a case in which gaps between the carbon fiber bundles were not seen over the entire sheet thus produced, the fiber spreadability was rated as ⊙; in a case in which one to three gaps having a length of 1 m or more were observed, the fiber spreadability was rated as ○; and in a case in which four or more gaps having a length of 1 m or more were observed, the fiber spreadability was rated as Δ.

Examples 10 and 11

Carbon fibers adhered with a sizing agent, and carbon-fiber-reinforced thermoplastic resin compositions were produced in the same manner as in Example 9, except that the aqueous resin dispersions obtained in Production Example 14 and Production Example 5 were respectively used instead of the aqueous resin dispersion obtained in Production Example 3, and the carbon fiber bundles and the resin compositions were evaluated.

Example 12

A carbon fiber bundle adhered with a sizing agent, and a carbon-fiber-reinforced thermoplastic resin composition were produced in the same manner as in Example 9, except that an aqueous resin dispersion prepared by mixing the aqueous resin dispersion obtained in Production Example 3 and jER (registered trademark) W2821R70 (trade name, epoxy resin emulsion manufactured by Mitsubishi Chemical Corp., viscosity of the solid content at 45° C.: 15 poises, includes a compound having plural epoxy groups as the component that is contained at the largest proportion, the content of the epoxy resin in the solid content is 85.7% by mass) such that the mass ratio of the solid contents would be 9:1, and adjusting the overall solid content concentration to 2.0% by mass, was used instead of the aqueous resin dispersion obtained by adjusting the aqueous resin dispersion obtained in Production Example 3 to a solid content concentration of 2.0% by mass. The carbon fiber bundle and the thermoplastic resin composition were evaluated.

Examples 13 and 14

Carbon fiber bundles adhered with a sizing agent, and carbon-fiber-reinforced thermoplastic resin compositions were produced in the same manner as in Example 12, except that aqueous resin dispersions prepared by mixing the aqueous resin dispersions obtained in Production Example 14 and Production Example 5 with W2821R70 were respectively used instead of the aqueous resin dispersion prepared by mixing the aqueous resin dispersion obtained in Production Example 3 and jER (registered trademark) W2821R70, and the carbon fiber bundles and the thermoplastic resin compositions were evaluated.

Examples 15, 16 and 17

Carbon fiber bundles adhered with a sizing agent, and carbon-fiber-reinforced thermoplastic resin compositions were produced in the same manner as in Example 13, except that the mass ratio of the solid contents of the aqueous resin dispersion obtained in Production Example 14 and jER (registered trademark) W2821R70 was changed to 8:2, 6:4, and 4:6, respectively, and the carbon fiber bundles and the thermoplastic resin compositions were evaluated.

Example 18

A carbon fiber bundle adhered with a sizing agent, and a carbon-fiber-reinforced thermoplastic resin composition were produced in the same manner as in Example 13, except that jER (registered trademark) W2821R70 was changed to the epoxy resin dispersion obtained in Production Example 15 and the carbon fiber bundle and the thermoplastic resin composition were evaluated. Incidentally, the viscosity of the solid content of the epoxy resin dispersion obtained in Production Example 15 was 23,000 poises at 45° C.

Comparative Example 4

A carbon fiber bundle adhered with a sizing agent, and a carbon-fiber-reinforced thermoplastic resin composition were produced in the same manner as in Example 9, except that jER (registered trademark) W2821R70 was used instead of the aqueous resin dispersion obtained in Production Example 3, and the carbon fiber bundle and the thermoplastic resin composition were evaluated.

Comparative Example 5

A carbon fiber bundle adhered with a sizing agent, and a carbon-fiber-reinforced thermoplastic resin composition were produced in the same manner as in Example 9, except that the aqueous resin dispersion obtained in Production Example 16 was used instead of the aqueous resin dispersion obtained in Production Example 3, and the carbon fiber bundle and the thermoplastic resin composition were evaluated.

The results of Examples 9 to 18 and Comparative Examples 4 and 5 described above are presented in Table 2. Incidentally, the 90° flexural strength of a unidirectional carbon fiber composite material molded plate is an index of the adhesiveness between the matrix resin and the carbon fiber bundle.

Examples 9 to 11 show, through a comparison with Comparative Examples 4 and 5, that carbon fiber bundles adhered with sizing agents that have satisfactory interfacial adhesiveness to both the carbon fiber bundle and the thermoplastic resin were obtained similarly to the cases of Examples 1 to 8.

Examples 12 to 17 show, through a comparison with Examples 9 to 11, that when a mixture of the polymer (AB) and the resin composition (D) is used, fiber spreadability is enhanced, and also, depending on the combination, the interfacial adhesiveness can be further enhanced.

Example 18 shows that due to the high viscosity of the resin composition (D), adhesiveness was exhibited, but the effect of enhancing fiber spreadability was insufficient.

From the above results, it was found that by using the resin composition (D), a carbon fiber bundle adhered with a sizing agent that has more favorable interfacial adhesiveness to both the carbon fiber bundle and the thermoplastic resin (and/or) has satisfactory fiber spreadability, a method for producing the carbon fiber bundle, a carbon-fiber-reinforced thermoplastic resin using the carbon fiber bundle, and a molded product of the thermoplastic resin are obtained.

Carbon fiber bundles adhered with sizing agents that were produced using the aqueous resin dispersion obtained in Production Example 14 in the same manner as in Examples 15 to 17 and jER (registered trademark) W2821R70 at mass ratios of these solid contents of 8:2, 6:4 and 4:6, respectively, were produced in the same manner as in Example 9.

Subsequently, prepregs were produced according to the section (Production of carbon fiber sheet and prepreg) of <Production of carbon-fiber-reinforced thermoplastic resin composition and measurement of properties 2>, and unidirectional carbon fiber composite material molded plates were produced according to the above section (Molding of unidirectional carbon fiber composite material molded plate (12 ply)).

A test was carried out according to the above section (90° Bending test) using the unidirectional carbon fiber composite material molded plates thus obtained. The results are presented in Table 3.

TABLE 3

| | Matrix resin | | | Sizing agent Mass ratio of | |
| --- | --- | --- | --- | --- | --- |
| | Modified polypropylene Mass ratio | Polypropylene Mass ratio | Acid content (%) | solid contents of aqueous resin dispersion and epoxy resin dispersion | 90° Flexural strength |
| Example 19 | 25 | 75 | 0.035 | 8:2 | 51 |
| Example 20 | 50 | 50 | 0.070 | 8:2 | 50 |
| Example 21 | 100 | 0 | 0.14 | 8:2 | 51 |

TABLE 2

| | Method for producing aqueous resin dispersion (olefin) | Epoxy resin dispersion | | Mass ratio of solid contents of aqueous resin dispersion and epoxy resin dispersion | Content of sizing agent Mass % | 90° Flexural strength MPa | Fiber spreadability |
| --- | --- | --- | --- | --- | --- | --- | --- |
| | | Component | Solid content viscosity (45° C.) Poise | | | | |
| Example 9 | Production Example 3 | — | — | 10:0 | 0.53 | 36 | Δ |
| Example 10 | Production Example 14 | — | — | 10:0 | 0.34 | 35 | Δ |
| Example 11 | Production Example 5 | — | — | 10:0 | 0.57 | 39 | Δ |
| Example 12 | Production Example 3 | W2821R70 | 15 | 9:1 | 0.57 | 38 | ○ |
| Example 13 | Production Example 14 | W2821R70 | 15 | 9:1 | 0.54 | 32 | ○ |
| Example 14 | Production Example 5 | W2821R70 | 15 | 9:1 | 0.54 | 43 | ○ |
| Example 15 | Production Example 14 | W2821R70 | 15 | 8:2 | 0.46 | 33 | ◉ |
| Example 16 | Production Example 14 | W2821R70 | 15 | 6:4 | 0.51 | 32 | ◉ |
| Example 17 | Production Example 14 | W2821R70 | 15 | 4:6 | 0.40 | 31 | ◉ |
| Example 18 | Production Example 14 | Production Example 15 | 23000 | 9:1 | 0.53 | 34 | Δ |
| Comparative Example 4 | — | W2821R70 | 15 | 0:10 | 0.40 | 11 | ◉ |
| Comparative Example 5 | Production Example 16 | — | — | 10:0 | 0.53 | 11 | ○ |

Examples 19 to 29

Mixed pellets were obtained by mixing an acid-modified propylene-based resin, "MODIC P958V" (trade name, manufactured by Mitsubishi Chemical Corp., content of acid modification: 0.14% by mass), and a polypropylene resin, "SA06GA" (trade name, manufactured by Japan Polypropylene Co., Ltd.), at the mass ratios indicated in Table 3 in a twin-screw extruder.

The pellets thus obtained were fed to a single-screw extruder (manufactured by IKG Corp., product name "PMS30"), and resin films having a thickness of 40 μm were obtained.

TABLE 3-continued

| | Matrix resin | | | Sizing agent Mass ratio of | |
| --- | --- | --- | --- | --- | --- |
| | Modified polypropylene Mass ratio | Polypropylene Mass ratio | Acid content (%) | solid contents of aqueous resin dispersion and epoxy resin dispersion | 90° Flexural strength |
| Example 22 | 25 | 75 | 0.035 | 6:4 | 55 |
| Example 23 | 50 | 50 | 0.070 | 6:4 | 57 |
| Example 24 | 100 | 0 | 0.14 | 6:4 | 61 |
| Example 25 | 25 | 75 | 0.035 | 4:6 | 48 |

TABLE 3-continued

|  | Matrix resin | | Sizing agent Mass ratio of | | |
| --- | --- | --- | --- | --- | --- |
|  | Modified polypropylene Mass ratio | Polypropylene Mass ratio | Acid content (%) | solid contents of aqueous resin dispersion and epoxy resin dispersion | 90° Flexural strength |
| Example 26 | 50 | 50 | 0.070 | 4:6 | 45 |
| Example 27 | 100 | 0 | 0.14 | 4:6 | 53 |
| Example 28 | 25 | 75 | 0.035 | 10:0 | 26 |
| Example 29 | 100 | 0 | 0.14 | 10:0 | 25 |

The invention claimed is:

1. A carbon fiber bundle for resin reinforcement purposes, comprising a carbon fiber bundle adhered with a polymer (AB), the polymer (AB) being formed by bonding an acid-modified polyolefin (A) having a polyolefin structure (a1) and an acidic group (a2) in the molecular structure, to a hydrophilic polymer (B) having a weight average molecular weight (Mw) of 450 or more,
wherein the mass ratio between the polyolefin structure (a1) and the acidic group (a2), (a1):(a2), in the acid-modified polyolefin (A) is 100:0.1 to 100:10; the mass ratio between the acid-modified polyolefin (A) and the hydrophilic polymer (B), (A):(B), is 100:1 to 100:100; and the content of the polymer (AB) in the carbon fiber bundle for resin reinforcement purposes is from 0.1% by mass to 8.0% by mass,
wherein the acidic group (a2) in the polymer (AB) is neutralized with a basic substance CC), or the acidic group (a2) is caused to react with the basic substance (C), and the pH at a temperature of 25° C. of an aqueous resin dispersion obtained by dispersing the polymer (AB) that has been neutralized by the basic substance (C), or the polymer (AB) that has reacted with the basic substance (C), in water at a solid content concentration of 30% by mass is from 6.0 to 10.0, and
wherein the basic substance (C) is a basic substance having a molecular weight of 100 or less.

2. The carbon fiber bundle for resin reinforcement purposes according to claim 1, wherein the acidic group (a2) is a carboxylic acid-derived group and/or a dicarboxylic acid anhydride-derived group.

3. The carbon fiber bundle for resin reinforcement purposes according to claim 1, wherein the polymer (AB) is a graft copolymer in which the hydrophilic polymer (B) is graft-bonded to the acid-modified polyolefin (A).

4. The carbon fiber bundle for resin reinforcement purposes according to claim 1, wherein the hydrophilic polymer (B) is a polyetheramine having a weight average molecular weight (Mw) of from 500 to 3000.

5. The carbon fiber bundle for resin reinforcement purposes according to claim 1, wherein the polyolefin that forms the polyolefin structure (a1) is a stereoblock polypropylene polymer having an isotactic block and an atactic block, and/or a propylene-α-olefin copolymer having a content of the propylene unit of 50 mol % or more.

6. The carbon fiber bundle for resin reinforcement purposes according to claim 1, wherein the weight average molecular weight (Mw) of the acid-modified polyolefin (A) is from 10,000 to 500,000.

7. The carbon fiber bundle for resin reinforcement purposes according to claim 1, wherein the polymer (AB) and a resin composition (D) containing an epoxy resin as a main component is adhered to the carbon fiber bundle, and the total content of the polymer (AB) and the resin composition (D) in the carbon fiber bundle for resin reinforcement purposes is from 0.1% by mass to 8.0% by mass.

8. The carbon fiber bundle for resin reinforcement purposes according to claim 7, wherein the epoxy resin included in the resin composition (D) is an aromatic epoxy resin.

9. The carbon fiber bundle for resin reinforcement purposes according to claim 7, wherein the viscosity at 25° C. of the resin composition (D) is 20,000 poises or less, and the mass ratio of the polymer (AB) and the resin composition (D) is 1:9 to 9.5:0.5.

10. A carbon-fiber-reinforced thermoplastic resin composition, comprising the carbon fiber bundle for resin reinforcement purposes according to claim 1 and a thermoplastic resin,
wherein the content of the carbon fiber bundle is from 3.0% by mass to 80.0% by mass.

11. The carbon-fiber-reinforced thermoplastic resin composition according to claim 10, wherein the thermoplastic resin is polypropylene.

12. A molded product, obtained by molding the carbon-fiber-reinforced thermoplastic resin composition according to claim 10.

13. A carbon-fiber-reinforced thermoplastic resin composition, comprising the carbon fiber bundle for resin reinforcement purposes according to claim 7 and a thermoplastic resin,
wherein the content of the carbon fiber bundle is from 3.0% by mass to 80.0% by mass, and
the thermoplastic resin is polypropylene and an acid-modified polypropylene.

14. The carbon-fiber-reinforced thermoplastic resin composition according to claim 13, wherein the content of an acid component in the thermoplastic resin composition is from 0.015% by mass to 0.20% by mass in terms of maleic anhydride.

15. The carbon-fiber-reinforced thermoplastic resin composition according to claim 13, wherein the mass ratio between the polymer (AB) and the resin composition (D) in the carbon fiber bundle for resin reinforcement purposes is 1:9 to 8:2.

16. A method for producing the carbon fiber bundle for resin reinforcement purposes according to claim 1,
the method comprising applying an aqueous resin dispersion containing at least the polymer (AB) to the carbon fiber bundle, and drying the carbon fiber bundle.

17. The method for producing a carbon fiber bundle for resin reinforcement purposes according to claim 16, wherein the polymer (AB) is dispersed at a 50% particle size of 200 nm or less in the aqueous resin dispersion containing the polymer (AB).

18. A method for producing the carbon fiber bundle for resin reinforcement purposes according to claim 7,
the method comprising applying an aqueous resin dispersion containing at least the polymer (AB) to the carbon fiber bundle, and drying the carbon fiber bundle,
wherein the aqueous resin dispersion further includes the resin composition (D).

* * * * *